United States Patent
Kaasila et al.

(10) Patent No.: US 9,691,169 B2
(45) Date of Patent: Jun. 27, 2017

(54) COMPACT FONT HINTING

(71) Applicant: Monotype Imaging Inc., Woburn, MA (US)

(72) Inventors: Sampo Juhani Kaasila, Plaistow, NH (US); Thomas A. Rickner, Madison, WI (US)

(73) Assignee: Monotype Imaging Inc., Woburn, MA (US)

( * ) Notice: Subject to any disclaimer, the term of this patent is extended or adjusted under 35 U.S.C. 154(b) by 0 days.

(21) Appl. No.: 14/290,473

(22) Filed: May 29, 2014

(65) Prior Publication Data

US 2015/0348297 A1    Dec. 3, 2015

(51) Int. Cl.
*G06T 11/60* (2006.01)
*G06F 17/30* (2006.01)
*G06T 1/20* (2006.01)
*G06T 1/60* (2006.01)
*G06T 11/20* (2006.01)

(52) U.S. Cl.
CPC .......... *G06T 11/60* (2013.01); *G06F 17/3028* (2013.01); *G06T 1/20* (2013.01); *G06T 1/60* (2013.01); *G06T 11/203* (2013.01)

(58) Field of Classification Search
None
See application file for complete search history.

(56) References Cited

U.S. PATENT DOCUMENTS

| | | | |
|---|---|---|---|
| 4,244,657 A | 1/1981 | Wasylyk | |
| 4,998,210 A | 3/1991 | Kadono | |
| 5,263,132 A | 11/1993 | Parker et al. | |
| 5,347,266 A | 9/1994 | Bauman et al. | |
| 5,412,771 A | 5/1995 | Fenwick | |
| 5,416,898 A | 5/1995 | Opstad et al. | |
| 5,444,829 A | 8/1995 | Kawabata et al. | |
| 5,453,938 A | 9/1995 | Gohara et al. | |
| 5,526,477 A | 6/1996 | McConnell et al. | |

(Continued)

FOREIGN PATENT DOCUMENTS

| | | |
|---|---|---|
| EP | 2166488 A2 | 3/2010 |
| EP | 2857983 | 4/2015 |

(Continued)

OTHER PUBLICATIONS

Japanese Office Action, 2013-508184, mailed Apr. 1, 2015.

(Continued)

*Primary Examiner* — Barry Drennan
*Assistant Examiner* — Schiller Hill
(74) *Attorney, Agent, or Firm* — Fish & Richardson P.C.

(57) ABSTRACT

A system includes a computing device that includes a memory configured to store instructions. The computing device also includes a processor to execute the instructions to perform operations that include receiving data representing a glyph in a font to present the glyph on a display. In response to operations being executed to present the glyph on the display, operations include identifying one or more values shared by glyphs of the font for adjusting the appearance of the glyph, from a data table stored with the glyph in the font. Operations also include adjusting a representation of the glyph using the identified one or more shared values for presentation on the display.

42 Claims, 13 Drawing Sheets

(56) References Cited

U.S. PATENT DOCUMENTS

| | | | |
|---|---|---|---|
| 5,528,742 A | 6/1996 | Moore et al. |
| 5,533,174 A | 7/1996 | Flowers et al. |
| 5,586,242 A | 12/1996 | McQueen et al. |
| 5,606,649 A | 2/1997 | Tai |
| 5,619,721 A | 4/1997 | Maruko |
| 5,630,028 A | 5/1997 | DeMeo |
| 5,737,599 A | 4/1998 | Rowe et al. |
| 5,748,975 A | 5/1998 | Van De Vanter |
| 5,757,384 A | 5/1998 | Ikeda |
| 5,781,714 A | 7/1998 | Collins et al. |
| 5,877,776 A | 3/1999 | Beaman et al. |
| 5,940,581 A | 8/1999 | Lipton |
| 5,995,718 A | 11/1999 | Hiraike |
| 6,012,071 A | 1/2000 | Krishna et al. |
| 6,016,142 A | 1/2000 | Chang |
| 6,031,549 A | 2/2000 | Hayes-Roth |
| 6,044,205 A | 3/2000 | Reed et al. |
| 6,065,008 A | 5/2000 | Simon et al. |
| 6,073,147 A | 6/2000 | Chan et al. |
| 6,111,654 A | 8/2000 | Cartier |
| 6,141,002 A | 10/2000 | Kanungo et al. |
| 6,249,908 B1 | 6/2001 | Stamm |
| 6,252,671 B1 | 6/2001 | Peng et al. |
| 6,282,327 B1 | 8/2001 | Betrisey |
| 6,313,920 B1 | 11/2001 | Dresevic et al. |
| 6,320,587 B1 | 11/2001 | Funyu |
| 6,330,577 B1 | 12/2001 | Kim |
| 6,343,301 B1 | 1/2002 | Halt et al. |
| 6,426,751 B1 | 7/2002 | Patel |
| 6,490,051 B1 | 12/2002 | Nguyen et al. |
| 6,512,531 B1 | 1/2003 | Gartland |
| 6,522,330 B2 | 2/2003 | Kobayashi |
| 6,522,347 B1 | 2/2003 | Tsuji |
| 6,583,789 B1 | 6/2003 | Carlson et al. |
| 6,657,625 B1 | 12/2003 | Chik et al. |
| 6,675,358 B1 | 1/2004 | Kido |
| 6,678,688 B1 | 1/2004 | Unruh |
| 6,687,879 B1 | 2/2004 | Teshima |
| 6,704,116 B1 | 3/2004 | Abulhab |
| 6,704,648 B1 | 3/2004 | Naik et al. |
| 6,718,519 B1 | 4/2004 | Taieb |
| 6,738,526 B1 | 5/2004 | Betrisey |
| 6,754,875 B1 | 6/2004 | Paradies |
| 6,760,029 B1 | 7/2004 | Phinney et al. |
| 6,771,267 B1 | 8/2004 | Muller |
| 6,810,504 B2 | 10/2004 | Cooper et al. |
| 6,813,747 B1 | 11/2004 | Taieb |
| 6,853,980 B1 | 2/2005 | Ying et al. |
| 6,856,317 B2 | 2/2005 | Konsella et al. |
| 6,882,344 B1 | 4/2005 | Hayes et al. |
| 6,901,427 B2 | 5/2005 | Teshima |
| 6,907,444 B2 | 6/2005 | Narasimhan et al. |
| 6,952,210 B1 | 10/2005 | Renner et al. |
| 6,993,538 B2 | 1/2006 | Gray |
| 7,050,079 B1 | 5/2006 | Estrada et al. |
| 7,064,757 B1 | 6/2006 | Opstad et al. |
| 7,064,758 B2 | 6/2006 | Chik et al. |
| 7,155,672 B1 | 12/2006 | Adler et al. |
| 7,184,046 B1 | 2/2007 | Hawkins |
| 7,188,313 B2 | 3/2007 | Hughes et al. |
| 7,228,501 B2 | 6/2007 | Brown et al. |
| 7,346,845 B2 | 3/2008 | Teshima et al. |
| 7,477,988 B2 | 1/2009 | Dorum |
| 7,492,365 B2 | 2/2009 | Corbin et al. |
| 7,505,040 B2 | 3/2009 | Stamm et al. |
| 7,539,939 B1 | 5/2009 | Schomer |
| 7,552,008 B2 | 6/2009 | Newstrom et al. |
| 7,580,038 B2 | 8/2009 | Chik et al. |
| 7,583,397 B2 | 9/2009 | Smith |
| 7,636,885 B2 | 12/2009 | Merz et al. |
| 7,701,458 B2 | 4/2010 | Sahuc et al. |
| 7,752,222 B1 | 7/2010 | Cierniak |
| 7,768,513 B2 | 8/2010 | Klassen |
| 7,836,094 B2 | 11/2010 | Ornstein et al. |
| 7,882,432 B2 | 2/2011 | Nishikawa et al. |
| 7,937,658 B1 | 5/2011 | Lunde |
| 7,944,447 B2 | 5/2011 | Clegg et al. |
| 7,958,448 B2 | 6/2011 | Fattic et al. |
| 8,098,250 B2 | 1/2012 | Clegg et al. |
| 8,116,791 B2 | 2/2012 | Agiv |
| 8,201,088 B2 | 6/2012 | Levantovsky et al. |
| 8,201,093 B2 | 6/2012 | Tuli |
| 8,306,356 B1 | 11/2012 | Bever |
| 8,381,115 B2 | 2/2013 | Tranchant et al. |
| 8,413,051 B2 | 4/2013 | Bacus et al. |
| 8,601,374 B2 | 12/2013 | Parham |
| 8,643,652 B2 | 2/2014 | Kaplan |
| 8,644,810 B1 | 2/2014 | Boyle |
| 8,689,101 B2 | 4/2014 | Fux et al. |
| 8,731,905 B1 | 5/2014 | Tsang |
| 9,569,865 B2 | 2/2017 | Kaasila et al. |
| 2001/0052901 A1 | 12/2001 | Kawabata et al. |
| 2002/0010725 A1 | 1/2002 | Mo |
| 2002/0033824 A1* | 3/2002 | Stamm .................. G06F 17/214 345/471 |
| 2002/0052916 A1 | 5/2002 | Kloba et al. |
| 2002/0057853 A1 | 5/2002 | Usami |
| 2002/0087702 A1 | 7/2002 | Mori |
| 2002/0093506 A1 | 7/2002 | Hobson |
| 2002/0174186 A1 | 11/2002 | Hashimoto et al. |
| 2002/0194261 A1 | 12/2002 | Teshima |
| 2003/0014545 A1 | 1/2003 | Broussard et al. |
| 2003/0076350 A1 | 4/2003 | Vu |
| 2003/0197698 A1 | 10/2003 | Perry et al. |
| 2004/0025118 A1 | 2/2004 | Renner |
| 2004/0088657 A1 | 5/2004 | Brown et al. |
| 2004/0119714 A1 | 6/2004 | Everett et al. |
| 2004/0177056 A1 | 9/2004 | Davis et al. |
| 2004/0189643 A1 | 9/2004 | Frisken et al. |
| 2004/0207627 A1 | 10/2004 | Konsella et al. |
| 2004/0233198 A1 | 11/2004 | Kubo |
| 2005/0015307 A1 | 1/2005 | Simpson et al. |
| 2005/0033814 A1 | 2/2005 | Ota |
| 2005/0094173 A1 | 5/2005 | Engelman et al. |
| 2005/0111045 A1 | 5/2005 | Imai |
| 2005/0128508 A1 | 6/2005 | Greef et al. |
| 2005/0149942 A1 | 7/2005 | Venkatraman |
| 2005/0190186 A1 | 9/2005 | Klassen |
| 2005/0193336 A1 | 9/2005 | Fux et al. |
| 2005/0200871 A1 | 9/2005 | Miyata |
| 2005/0264570 A1* | 12/2005 | Stamm .................. G06T 11/40 345/469 |
| 2005/0270553 A1 | 12/2005 | Kawara |
| 2005/0275656 A1 | 12/2005 | Corbin et al. |
| 2006/0010371 A1 | 1/2006 | Shur et al. |
| 2006/0017731 A1 | 1/2006 | Matskewich et al. |
| 2006/0061790 A1 | 3/2006 | Miura |
| 2006/0072136 A1 | 4/2006 | Hodder et al. |
| 2006/0072137 A1 | 4/2006 | Nishikawa et al. |
| 2006/0072162 A1 | 4/2006 | Nakamura |
| 2006/0103653 A1 | 5/2006 | Chik et al. |
| 2006/0103654 A1 | 5/2006 | Chik et al. |
| 2006/0168639 A1 | 7/2006 | Gan |
| 2006/0241861 A1 | 10/2006 | Takashima |
| 2006/0245727 A1 | 11/2006 | Nakano et al. |
| 2006/0267986 A1 | 11/2006 | Bae et al. |
| 2006/0269137 A1 | 11/2006 | Evans |
| 2006/0285138 A1 | 12/2006 | Merz et al. |
| 2007/0002016 A1 | 1/2007 | Cho et al. |
| 2007/0006076 A1 | 1/2007 | Cheng |
| 2007/0008309 A1 | 1/2007 | Sahuc et al. |
| 2007/0050419 A1 | 3/2007 | Weyl et al. |
| 2007/0055931 A1 | 3/2007 | Zaima |
| 2007/0139412 A1* | 6/2007 | Stamm .................. G06T 11/203 345/467 |
| 2007/0139413 A1 | 6/2007 | Stamm et al. |
| 2007/0159646 A1 | 7/2007 | Adelberg et al. |
| 2007/0172199 A1 | 7/2007 | Kobayashi |
| 2007/0211062 A1 | 9/2007 | Engleman et al. |
| 2007/0283047 A1 | 12/2007 | Theis et al. |
| 2008/0028304 A1 | 1/2008 | Levantovsky et al. |
| 2008/0030502 A1 | 2/2008 | Chapman |
| 2008/0154911 A1 | 6/2008 | Cheng |
| 2008/0282186 A1 | 11/2008 | Basavaraju |

(56) References Cited

U.S. PATENT DOCUMENTS

| | | |
|---|---|---|
| 2008/0303822 A1 | 12/2008 | Taylor |
| 2008/0306916 A1 | 12/2008 | Gonzalez et al. |
| 2009/0031220 A1 | 1/2009 | Tranchant |
| 2009/0063964 A1 | 3/2009 | Huang |
| 2009/0119678 A1 | 5/2009 | Shih |
| 2009/0158134 A1 | 6/2009 | Wang |
| 2009/0183069 A1 | 7/2009 | Duggan et al. |
| 2009/0275351 A1 | 11/2009 | Jeung et al. |
| 2009/0287998 A1 | 11/2009 | Kalra |
| 2009/0303241 A1 | 12/2009 | Priyadarshi et al. |
| 2009/0307585 A1 | 12/2009 | Tranchant et al. |
| 2010/0014104 A1 | 1/2010 | Soord |
| 2010/0066763 A1 | 3/2010 | MacDougall |
| 2010/0088606 A1 | 4/2010 | Kanno |
| 2010/0088694 A1 | 4/2010 | Peng |
| 2010/0091024 A1 | 4/2010 | Myadam |
| 2010/0115454 A1 | 5/2010 | Tuli |
| 2010/0164984 A1 | 7/2010 | Rane |
| 2010/0218086 A1 | 8/2010 | Howell et al. |
| 2010/0231598 A1 | 9/2010 | Hernandez et al. |
| 2010/0275161 A1 | 10/2010 | DiCamillo |
| 2010/0321393 A1 | 12/2010 | Levantovsky |
| 2011/0029103 A1 | 2/2011 | Mann et al. |
| 2011/0090229 A1 | 4/2011 | Bacus et al. |
| 2011/0090230 A1 | 4/2011 | Bacus et al. |
| 2011/0093565 A1 | 4/2011 | Bacus et al. |
| 2011/0115797 A1 | 5/2011 | Kaplan |
| 2011/0131153 A1 | 6/2011 | Grim, III |
| 2011/0188761 A1 | 8/2011 | Boutros et al. |
| 2011/0238495 A1 | 9/2011 | Kang |
| 2011/0271180 A1 | 11/2011 | Lee |
| 2011/0276872 A1 | 11/2011 | Kataria |
| 2011/0289407 A1 | 11/2011 | Naik |
| 2011/0310432 A1 | 12/2011 | Waki |
| 2012/0001922 A1 | 1/2012 | Escher et al. |
| 2012/0016964 A1 | 1/2012 | Veen et al. |
| 2012/0033874 A1 | 2/2012 | Perronnin |
| 2012/0066590 A1 | 3/2012 | Harris et al. |
| 2012/0072978 A1 | 3/2012 | DeLuca |
| 2012/0092345 A1 | 4/2012 | Joshi et al. |
| 2012/0102176 A1 | 4/2012 | Lee et al. |
| 2012/0102391 A1 | 4/2012 | Lee et al. |
| 2012/0127069 A1 | 5/2012 | Santhiveeran et al. |
| 2012/0215640 A1 | 8/2012 | Ramer et al. |
| 2012/0288190 A1 | 11/2012 | Tang |
| 2012/0306852 A1 | 12/2012 | Taylor |
| 2012/0307263 A1 | 12/2012 | Ichikawa et al. |
| 2012/0323694 A1 | 12/2012 | Lita et al. |
| 2012/0323971 A1 | 12/2012 | Pasupuleti |
| 2013/0033498 A1* | 2/2013 | Linnerud .......... G06F 9/3017 345/467 |
| 2013/0120396 A1 | 5/2013 | Kaplan |
| 2013/0127872 A1 | 5/2013 | Kaplan |
| 2013/0156302 A1 | 6/2013 | Rodriguez Serrano et al. |
| 2013/0163027 A1 | 6/2013 | Shustef |
| 2013/0179761 A1 | 7/2013 | Cho |
| 2013/0215126 A1 | 8/2013 | Roberts |
| 2013/0215133 A1 | 8/2013 | Gould et al. |
| 2013/0321617 A1 | 12/2013 | Lehmann |
| 2014/0025756 A1 | 1/2014 | Kamens |
| 2014/0153012 A1 | 6/2014 | Seguin |
| 2015/0100882 A1 | 4/2015 | Severenuk |
| 2015/0193386 A1 | 7/2015 | Wurtz |
| 2015/0278167 A1 | 10/2015 | Arnold et al. |
| 2015/0339273 A1 | 11/2015 | Yang et al. |
| 2015/0339543 A1 | 11/2015 | Campanelli et al. |

FOREIGN PATENT DOCUMENTS

| | | |
|---|---|---|
| JP | 06-258982 | 9/1994 |
| JP | 10-124030 | 5/1998 |
| JP | 2002-507289 | 3/2002 |
| JP | 05-215915 | 8/2005 |
| JP | 05-217816 | 8/2005 |
| JP | 07-011733 | 1/2007 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 2004/012099 | 2/2004 |
| WO | WO 2005/001675 | 1/2005 |

OTHER PUBLICATIONS

International Preliminary Report on Patentability issued in PCT application No. PCT/US2013/071519 dated Jun. 9, 2015, 9 pages.
European Search Report, 14187549.2, Jul. 30, 2015 7 pages.
Saurabh, Kataria et al., "Font retrieval on a large scale: An experimental study", 2010 17$^{th}$ IEEE International Conference on Image Processing (ICIP 2010); Sep. 26-29, 2010; Hong Kong, China, IEEE, Piscataway, NJ, USA, Sep. 26, 2010, pp. 2177-2180.
"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.
Adobe Systems Incorporated, "The Type 42 Font Format Specification," Technical Note #5012, Jul. 31, 1998, pp. 1-24.
Adobe Systems Incorporated, "PostScript Language Reference—Third Edition," Feb. 1999, pp. 313-390.
Adobe Systems Incorporated, "To Unicode Mapping File Tutorial," Adobe Technical Note, XP002348387, May 2003.
"Announcing Speakeasy: A new open-source language tool from Typekit," Oct. 28, 2010, on-line http://blog.typekit.com/2010/10/28/announcing-speakeasy-a-new-open-source-language-tool-from-typekit/.
Apple Computers, "The True Type Font File," Oct. 27, 2000, pp. 1-17.
Celik et al., "W3C, CSS3 Module: Fonts," W3C Working Draft, Jul. 31, 2001, pp. 1-30.
"Colorfont/v1," Feb. 28, 2011, retrieved from the internet: http://manufacturaindependente.com/colorfont/v1/.
Doughty, Mike, "Using OpenType® Fonts with Adobe® InDesign®," Jun. 11, 2012 retrieved from the internet: http://webarchive.org/web/20121223032924/http://www.sketchpad.net/opentype-indesign.htm (retrieved Sep. 22, 2014), 2 pages.
Extensis, Suitcase 10.2, Quick Start Guide for Macintosh, 2001, 23 pgs.
Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.
International Search Report & Written Opinion issued in PCT application No. PCT/US10/01272, mailed Jun. 15, 2010, 6 pages.
International Search Report & Written Opinion issued in PCT application No. PCT/US2011/034050 dated Jul. 15, 2011, 13 pages.
International Search Report & Written Opinion, PCT/US2013/026051, mailed Jun. 5, 2013, 9 pages.
International Search Report & Written Opinion, PCT/US2013/071519, mailed Mar. 5, 2014, 12 pages.
International Search Report & Written Opinion, PCT/US2013/076917, mailed Jul. 9, 2014, 11 pages.
International Search Report & Written Opinion, PCT/US2014/010786, mailed Sep. 30, 2014, 9 pages.
Japanese Office Action, 2009-521768, mailed Aug. 28, 2012.
Open Text Exceed, User's Guide, Version 14, Nov. 2009, 372 pgs.
"photofont.com — Use photofonts," Sep. 2, 2012, retrieved from the internet: http://web.archive.org/web/20120902021143/http://photofont.com/photofont/use/web.
Supplementary European Search Report, European Patent Office, European patent application No. EP 07796924, dated Dec. 27, 2010, 8 pages.
TrueType Fundamentals, Microsoft Typography, Nov. 1997, pp. 1-17.
Universal Type Server, Upgrading from Suitcase Server, Sep. 29, 2009, 18 pgs.

(56) References Cited

OTHER PUBLICATIONS

Wenzel, Martin, "An Introduction to OpenType Substitution Features," Dec. 26, 2012, Retrieved from the internet: http://web.archive.org/web/20121226233317/http://ilovetypography.com/OpenType/opentype-features. Html (retrieved on Sep. 18, 2014), 12 pages.

European Search Report, 14184499.3, Jul. 13, 2015, 7 pages.

"Flash CS4 Professional ActionScript 2.0", 2007, retrieved on http://help.adobe.com/en_US/AS2LCR/Flash_10.0/help.html?content=00000284.html on Aug. 31, 2015.

European Search Report, 13179728.4, Sep. 10, 2015, 3 pages.

Ma Wei-Ying et al., "Framework for adaptive content delivery in heterogeneous network environments", Jan. 24, 2000, Retrieved from the Internet: http://www.cooltown.hp.com/papers/adcon/MMCN2000.

"Saffron Type System", retrieved from the internet Nov. 12, 2014, 7 pages.

Font Pair, [online]. "Font Pair", Jan. 20, 2015, Retrieved from URL: http://web.archive.org/web/20150120231122/http://fontpair.com/, 31 pages.

typeconnection, [online]. "typeconnection", Feb. 26, 2015, Retrieved from URL: http://web.archive.org/web/20150226074717/http://www.typeconnection.com/stepl.php, 4 pages.

International Search Report & Written Opinion, PCT/US2016/023282, mailed Oct. 7, 2016, 16 pages.

\* cited by examiner

COMPACT FONT HINTING

BACKGROUND

This description relates to rendering font characters, such as characters provided in a scalable font format. Along with providing aesthetic improvements to the character rendering and legibility, performance improvements in data transferability can be achieved.

Proportional to the astronomical growth of textual content available on the Internet, the demand to express such content has grown. Similar to the variety of products provided by physical and online stores, content authors, publishers and viewers have grown to expect a wide assortment of content viewing formats, such as different fonts, to view text. However, as the sheer number of potential presentation formats grows, the ability to provide such variants may become hindered.

SUMMARY

The systems and techniques described can aid in the transfer of web based assets (e.g., web pages, web sites, etc.) by reducing the amount of data needed to adjust textual content included in the asset for presentation. By reducing the amount of data, instructions, etc. needed to adjust text (e.g., for presenting on different displays), data transmission times can be decreased and the time needed by a device to present the asset (e.g., load time for a smartphone to present a web page) and memory requirements (e.g., memory needs for storing fonts employed by the textual content can be reduced).

In one aspect, a computing device implemented method includes receiving data representing a glyph in a font to present the glyph on a display. In response to operations being executed to present the glyph on the display, the method also includes identifying one or more values shared by glyphs of the font for adjusting the appearance of the glyph, from a data table stored with the glyph in the font. The method also includes adjusting a representation of the glyph using the identified one or more shared values for presentation on the display.

Implementations may include one or more of the following features. The font may have a scalable font format. The shared values associated with the font format may represent control values. In response to the operations being executed to present the glyph on the display, points of an outline of the glyph may be identified from data stored with the glyph in the font. In response to the operations being executed to present the glyph on the display, one or more adjustments to the identified points of the outline of the glyph may be identified. Identifying the one or more shared values may be initiated by executing a single instruction. Identifying the one or more shared values may be initiated by executing a single function call that includes data identifying the single function call. Identifying the one or more shared values may be initiated by executing a single instruction that includes data representing one or more points of the glyph. Identifying the one or more shared values may be initiated by executing a single function call that includes one or more arguments that represent outline points of the glyph. Identifying the one or more control values may be initiated by executing multiple instructions. Identifying the one or more shared values may be initiated by executing one or more instructions in a repeated manner. If the one or more shared values is unattainable from the single function call that includes a function identifier, identifying the one or more shared values may be initiated by executing a single function call that includes one or more arguments that represent outline points of the glyph. If the one or more shared values is unattainable from the single function call that includes a function identifier and is unattainable from the single function call that includes one or more arguments that represent outline points of the glyph, identifying the one or more shared values may be initiated by executing multiple instructions. Adjusting a representation of the glyph using the identified one or more shared values may include adjusting the position of one or more data points located on an outline of the glyph.

In another aspect, a system includes a computing device that includes a memory configured to store instructions. The computing device also includes a processor to execute the instructions to perform operations that include receiving data representing a glyph in a font to present the glyph on a display. In response to operations being executed to present the glyph on the display, operations include identifying one or more values shared by glyphs of the font for adjusting the appearance of the glyph, from a data table stored with the glyph in the font. Operations also include adjusting a representation of the glyph using the identified one or more shared values for presentation on the display.

Implementations may include one or more of the following features. The font may have a scalable font format. The shared values associated with the font format may represent control values. In response to the operations being executed to present the glyph on the display, points of an outline of the glyph may be identified from data stored with the glyph in the font. In response to the operations being executed to present the glyph on the display, one or more adjustments to the identified points of the outline of the glyph may be identified. Identifying the one or more shared values may be initiated by executing a single instruction. Identifying the one or more shared values may be initiated by executing a single function call that includes data identifying the single function call. Identifying the one or more shared values may be initiated by executing a single instruction that includes data representing one or more points of the glyph. Identifying the one or more shared values may be initiated by executing a single function call that includes one or more arguments that represent outline points of the glyph. Identifying the one or more control values may be initiated by executing multiple instructions. Identifying the one or more shared values may be initiated by executing one or more instructions in a repeated manner. If the one or more shared values is unattainable from the single function call that includes a function identifier, identifying the one or more shared values may be initiated by executing a single function call that includes one or more arguments that represent outline points of the glyph. If the one or more shared values is unattainable from the single function call that includes a function identifier and is unattainable from the single function call that includes one or more arguments that represent outline points of the glyph, identifying the one or more shared values may be initiated by executing multiple instructions. Adjusting a representation of the glyph using the identified one or more shared values may include adjusting the position of one or more data points located on an outline of the glyph.

In another aspect, one or more computer readable media storing instructions are executable by a processing device, and upon such execution cause the processing device to perform operations that include receiving data representing a glyph in a font to present the glyph on a display. In response to operations being executed to present the glyph on the display, operations also include identifying one or more values shared by glyphs of the font for adjusting the appearance of the glyph, from a data table stored with the glyph in the font. Operations also include adjusting a representation of the glyph using the identified one or more shared values for presentation on the display.

Implementations may include one or more of the following features. The font may have a scalable font format. The shared values associated with the font format may represent control values. In response to the operations being executed to present the glyph on the display, points of an outline of the glyph may be identified from data stored with the glyph in the font. In response to the operations being executed to present the glyph on the display, one or more adjustments to the identified points of the outline of the glyph may be identified. Identifying the one or more shared values may be initiated by executing a single instruction. Identifying the one or more shared values may be initiated by executing a single function call that includes data identifying the single function call. Identifying the one or more shared values may be initiated by executing a single instruction that includes data representing one or more points of the glyph. Identifying the one or more shared values may be initiated by executing a single function call that includes one or more arguments that represent outline points of the glyph. Identifying the one or more control values may be initiated by executing multiple instructions. Identifying the one or more shared values may be initiated by executing one or more instructions in a repeated manner. If the one or more shared values is unattainable from the single function call that includes a function identifier, identifying the one or more shared values may be initiated by executing a single function call that includes one or more arguments that represent outline points of the glyph. If the one or more shared values is unattainable from the single function call that includes a function identifier and is unattainable from the single function call that includes one or more arguments that represent outline points of the glyph, identifying the one or more shared values may be initiated by executing multiple instructions. Adjusting a representation of the glyph using the identified one or more shared values may include adjusting the position of one or more data points located on an outline of the glyph.

These and other aspects, features, and various combinations may be expressed as methods, apparatus, systems, means for performing functions, program products, etc.

Other features and advantages will be apparent from the description and the claims.

DETAILED DESCRIPTION

Figure 1:
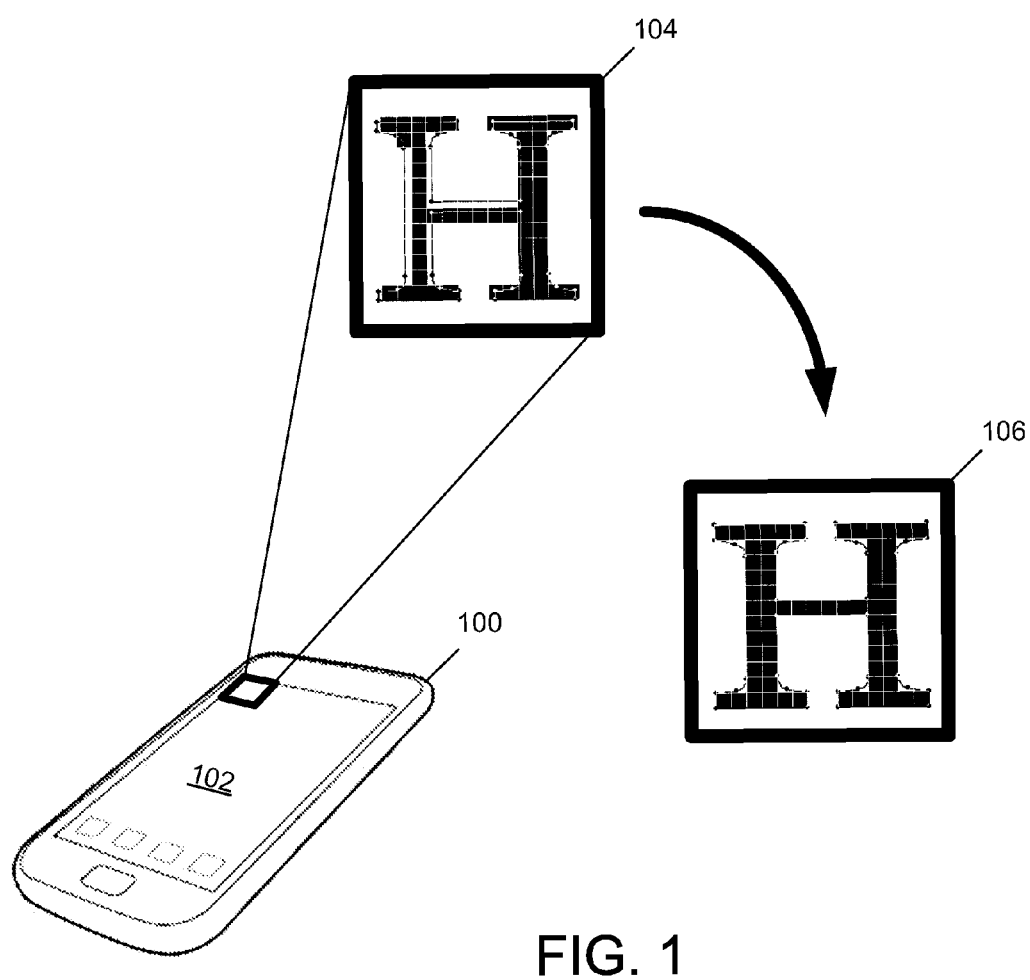
FIG. 1 illustrates a smartphone presenting textual content of an asset.

Referring to FIG. 1, a computing device (e.g., a smartphone 100) includes a display 102 that allows a user to view, edit, etc. various types of content, such as text, via one or more applications being executed (e.g., a browser, a word processor, etc.). As originally prepared, textual content may be quite readable, however, the text may become less aesthetically appealing and potentially less legible depending upon the capabilities of the viewing device being used. For example, the resolution of the display 102 may be noticeably lower compared to the resolution of other types of displays. Such degradation of presented text may also depend upon the format of the text to be presented. For example, text provided in a scalable font format (e.g., OpenType fonts, TrueType fonts, etc.) may appear less legible when presented than other text formats. As demonstrated in the figure, due to the smaller size and relatively low resolution of the display 102 of the device, a distorted character 104 is presented that may cause difficulties (e.g., eye strain) for a viewer.

To alleviate such distortion, one or more techniques may be implemented; for example, pixel-level corrections may be employed to adjust the character. Such restoration techniques, referred to as hinting techniques, can adjust the outline, filling, etc. of the character (e.g., adjust rounding, line thickness, character height, width etc.). In this illustration, by applying a hinting technique, the pixel-level adjustments are executed and applied to the character 104 to produce a less distorted character 106 that may comparatively be more legible when presented on the lower resolution display 102. For example, pixels may be manipulated to adjust the roundness, thickness, etc. of the portions of the presented character. Also with improved legibility, application of the hinting technique may improve the aesthetic appearance of the text for the viewer.

To execute such adjustments, characters may be manually adjusted by a professional technician employing a computer system (or other similar device) prior to sending the text to the viewing device. Automation techniques may also be utilized; for example, one or more operations may be executed by the smartphone 100 individually or in concert with one or more other computing devices. In some arrangements, such automatic operations, referred to as auto-hinting operations, may be executed external from the smartphone 100, such as by one or more remotely located computing devices. Auto-hinting may considered a two-stage process in which hinting instructions are first determined and then these instructions are executed during a second stage to accordingly adjust the glyph points (e.g., outline points). By directly adjusting glyph points without determining instructions to perform these operations, a single stage process can be developed to provide efficient hinting. Executing this single stage process as the glyph is prepared for presentation, the process can be considered runtime auto-hinting.

Figure 2:
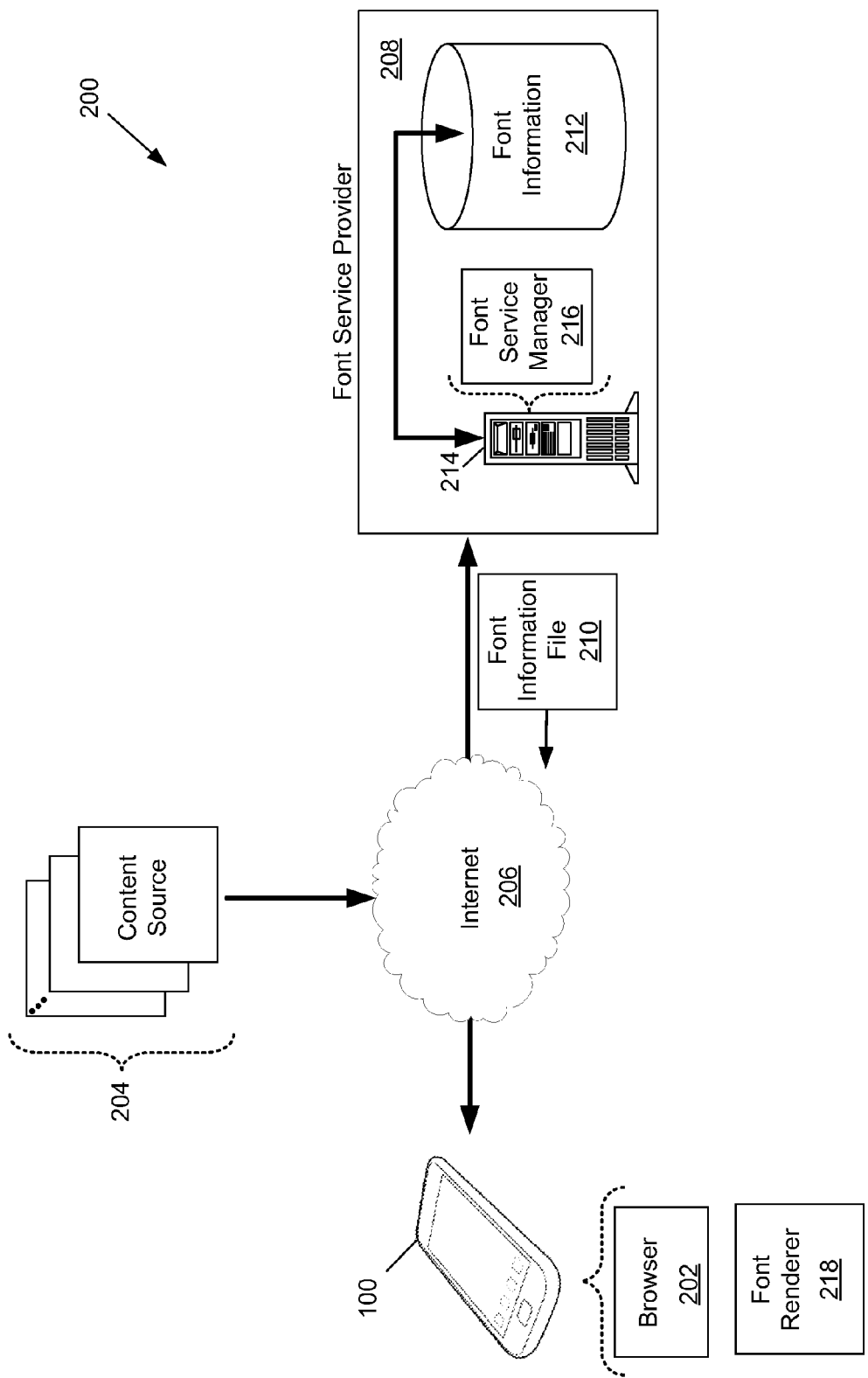
FIG. 2 is a block diagram of an Internet based computer network that distributes font-based information to user devices.

Referring to FIG. 2, a computing environment 200 is presented that includes the smartphone 100, which is capable of interacting with a user (via a touch display, keypad device, etc.). Additionally, the smartphone 100 may execute one or more applications (e.g., a browser 202) to request and present content (e.g., text, graphics, video, etc.) of assets (e.g., a web page, a website, etc.) provided from a variety of content sources 204 (e.g., remote servers or other types of computing devices etc.) via the Internet 206 or one or more other types of networks.

In the presented environment 200, the smartphone 100 is also capable of communicating with a font service provider 208 (e.g., via the Internet 206) in order to be provided font information (e.g., one or more fonts needed to present text included in an asset to be presented by the browser 202). For example, one or more files, such as a font information file 210, may be produced by the font service provider 208 and sent to the smartphone 100. In some arrangements, the font service provider 208 may also provide executable instructions (e.g., programs, functions, etc.) in order to perform operations, such as using the font information to prepare and present the text content of an asset (received from one of the content sources 204). Along with instructions to assist with presenting textual content, other types of functionality may or may not be provided. For example, for some cases instructions may be included in the font information file 210 that when executed may direct the deletion of one or more fonts residing at the smartphone 100 (e.g., fonts previously provided by the font service provider 208) based on one or more predefined conditions (e.g., an expired license term, rental period, or similar period of time).

To provide the appropriate font information to the smartphone 100, the font service provider 208 may access one or more libraries of fonts, font information, etc. that may be stored locally or remotely. For example, font libraries and libraries of font information may be stored in a storage device 212 (e.g., one or more hard drives, CD-ROMs, etc.) on site (at the font service provider 208). Being accessible by a server 214, the libraries may be used, along with information provided by the smartphone 100 (e.g., included in a request message), to attain the appropriate font information. Illustrated as being stored in a single storage device 212, the font service provider 208 may also use numerous storage techniques and devices to retain collections of fonts and related font information (e.g., different font styles, languages, etc.). The font service provider 208 may also access font information at separate locations as needed. For example, along with identifying fonts potentially needed for the smartphone 100, the server 214 may also be used to collect needed font information, device information, etc. from one or more sources external to the font service provider 208 (e.g., via the Internet 206).

To provide the functionality of managing the distribution of font information to potential recipient devices such as the smartphone 100, the server 214 executes a font service manager 216, which, in general, manages the flow of information (e.g., receives requests, delivers requested font information, etc.). The font service manager 216 also manages fonts, data associated with fonts, storage of font information for later retrieval, etc. As such, font information may be quickly identified and provided to a requesting computing device (e.g., the smartphone 100). In one arrangement, a database (or other technique for structuring and storing data) is stored at the font service provider 208 (e.g., on the storage device 212) and includes records that represent the fonts and related information. In some instances, the font information is identified in part from information provided by a request (or multiple requests) sent to the font service provider 212. Similarly, the font service provider 208 may perform operations (e.g., tracking, monitoring, etc.) regarding types of information to be collected, preserved, used, etc. For example, records may be stored for future use that reflect particular fonts that have been requested from and provided to an individual computing device, the type of computing device, etc.

In this particular illustration, the browser application 202 is executed by the smartphone 100 to allow a user to select one or more assets of interest (e.g., a website, webpage, etc.), collect the asset(s) from one or more of the content sources 204, and present the information of interest on the display of the smartphone. Other types of applications may be similarly be executed by the smartphone 100 to attain and present similar or different assets. To assist with preparing text content for presentation on the display, a font renderer 218 is executed by the smartphone 100 to perform pixel-level corrections to hint font characters (e.g., auto-hinting operations). Along with assisting rendering operations, the font renderer 218 may provide functionality in rasterizing, compiling, interpolation, and/or other types of processing for preparing text for presentation. For one example, once a scale size for a font is identified (e.g., selected by a viewer, provided by the asset to present, etc.), the font renderer 218 may execute operations to adjust the outlines, fill, etc. of individual characters to account for the resolution of the display (e.g., of the smartphone 100). In such low resolution displays, character portions may become undesirably rounded or portions may appear overly thin or improperly thick. Various techniques may be employed by the font renderer 218 for corrective action; for example, operations may be executed to equalize the weights of character stems in order to maintain aesthetic appearance and legibility of the presented character. To provide this functionality, the font renderer 218 can employ data, instructions, etc. from the font information file 210 as provided by the font service provider 208. In other arrangements, operations of the font hinter 218 (or other types of operations executed by the smartphone 100) may be capable producing information needed for corrective action.

Figure 3:
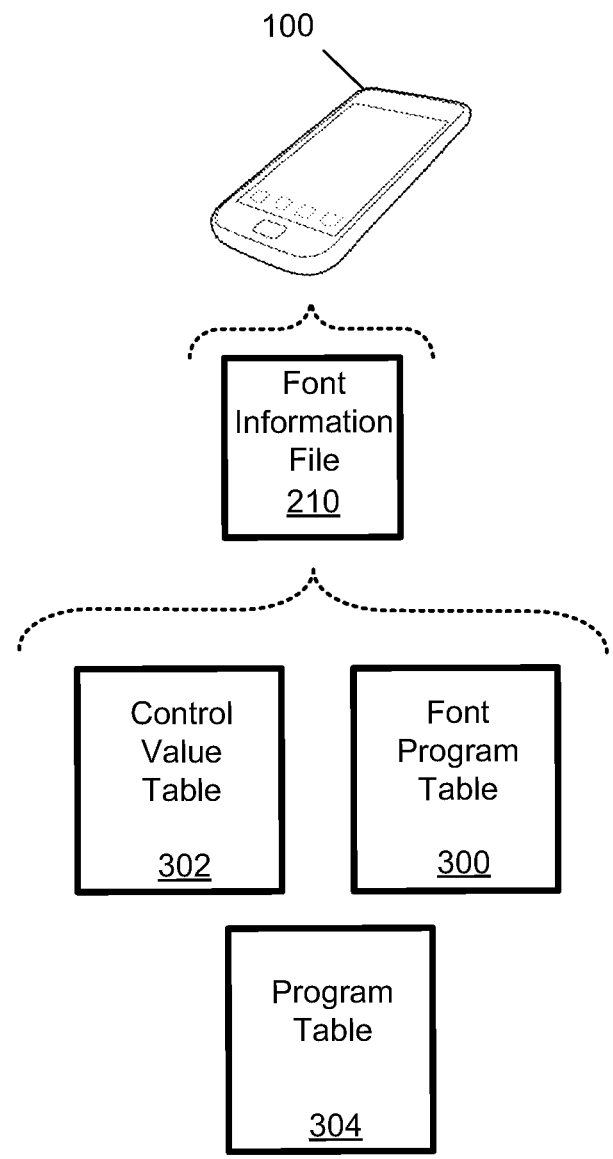
FIG. 3 illustrates font information transmitted to and stored on a user device such as a smartphone.

Referring to FIG. 3, one or more techniques may be employed to provide information to the smartphone 100 for presenting characters in a particular font and hinting the font characters, if needed, for presentation. For example, some employed techniques may reduce the amount of information needed to execute hinting operations (e.g., auto-hinting operations), thereby reducing memory needs. Through such reductions, less information may need to be transferred to the smartphone (e.g., from the font service provider 208), thereby potentially reducing the time needed to transfer the information and potentially the time needed to present the textual content (and correspondingly, an asset) on the display of the smartphone 100. For example, a reduced amount of hinting information may be included in font information (e.g., provided by the font service provider). Also by reducing the amount of hinting information, less memory space is needed for storing fonts for use by a computing device, archiving at the font service provider, etc. In one arrangement, hinting information is provided by one or more executable instructions (e.g., auto-hinting instructions) that are embedded in the font information. For example, the hinting instruction or instructions may be executed as the corresponding font character is being prepared for display. As such, information needed to hint the character is determined at presentation time and does not need to be previously determined and stored for later use. For example, rather than determining and storing hint byte codes prior to use, the information may be determined while preparing a corresponding character for display (e.g., at run time of character presentation). As such, the instruction or instructions included with the font information are executed at run time to produce the information to appropriately hint the character. For example, rather than predetermining and providing hinting values (e.g., control values) associated with a character's height with the font, the values may be provided at run time.

One or more types of instructions, groups of instructions, etc. may be utilized for determining hinting information as needed at run time. For example, subroutines, procedures, functions, routines, methods, subprograms, etc. may provide an instruction or a sequence of instructions embedded with font information for a particular character. In general, such an instruction or sequence of instructions may be executed in one or more instances (e.g., called) and then branch back (e.g., return) to another instruction (if another instruction is to be executed). Along with the one or more executable instructions (e.g., function calls, subroutines, etc.), data (e.g., data points) may be embedded in the font information for use when executing instructions at run time. In some instances, a single instruction (e.g., function call) may be embedded with only identifying data (e.g., an integer that represents the function). Through the use of a single executable instruction (e.g., function call), the amount of embedded information is reduced compared to multiple instructions with additional data (e.g., control value table indices) being provided to hint font characters. Such a single executable instruction can reduce the size of the font information (e.g., the font information file 210) provided to the end user device (e.g., the smartphone 100). Correspondingly, storage needs are reduced at the user device.

In some instances, a single instruction (with just an identifier number) may not completely provide the amount of auto-hinting functionality needed, for example, to accurately present a font character on a display. In such instances, another technique may be employed to hint the character. For example, data may be provided with a function call for auto-hinting the character. Data associated with points that lay on the outline on the character (e.g., a point located at the maximum vertical position of the character outline). By providing this additional information (e.g., one or more data points along with the function call), the font character may be more appropriately hinted for presentation (e.g., on the display of the smart phone 100, a low resolution device, etc.). In still other instances, the use of a single executable instruction or an instruction with additional data (e.g., one or more data points) may not be capable of appropriately having the character rendered. In such circumstances, one or more other techniques may be implemented. For example, multiple executable instructions may be employed for hinting the character. For this scenario, the multiple instructions may increase the memory needs at the user device, the time needed to transfer the multiple instructions (compared to transferring a single instruction), etc. However, using multiple instructions for some characters (e.g., complex shaped characters) and one executable instruction and/or one executable instruction and data for hinting other characters (e.g., characters with relatively simple shapes), the overall memory needs, data transfer needs, etc. may decrease compared to using multiple instructions for each character.

To determine whether a single instruction (with identifying information), one instruction with data, multiple instructions, etc. are needed for hinting a glyph of the font, one or more techniques may be implemented. For example, a desired hinting of a character may be compared to the hinting of the character provided by the single instruction. If the comparison reports the two hinted characters as being substantially simple, the single instruction may be used in auto-hinting the character. If not similar, the desired hinting of the character may be compared to character hinting provided by using one instruction and additional data (e.g., data points). If it is substantially similar to the desired hinting, then the instruction and data can be used for hinting the character. If neither the single instruction (with identifying information) nor the single instruction with additional data provided a hinted character similar to the desired hinted character, multiple instructions may be employed for hinting the character. Various types of comparison criteria may be employed, such as identifying points residing in the outline of the character that can assist with hinting a glyph, character, etc. For example, points identified as needing adjustment (e.g., should be moved in location to appropriately hint a character as desired) can be compared to points identified by the techniques mentioned above (e.g., determined by a single instruction with identifying information, determined by a single instruction with additional data, etc.). By comparing the identified outline points, an appropriate hinting technique can be identified for use at run time for presenting the glyph, character, etc.

One or more techniques and architectures may be implemented for employing such instructions. For example, the font information file 210 (provided by the font service provider 208) for a particular font can include vehicles for storing and executing such hinting instructions. For example, appropriate hinting instructions can be associated with each font character. In one arrangement, a table of instructions as a font program table (fpgm) 300 is provided with the font information file. The font program table 300 can be considered as storing functions, routines, processes, etc. that can be called (e.g., by a program for execution) along with accessing data (e.g., data points, etc.) as needed. By using such an architecture for storing callable instructions, the amount of instructions included in programs for presenting font characters can be reduced. The font information file 210 may also include one or more data tables, such as a control value table (CVT) 302, which includes data that represents different measurements of features of the font. For example, measurement values associated with stem widths, heights of characters (in the vertical direction, the horizontal direction, etc.), serif lengths and heights, italic angle, etc. may be represented in the CVT 302. Such control values can be considered as values that are shared within a particular font. For the particular font being hinted by the fpgm 300 and the CVT 302, a program table 304 (also known as a preprogram table or "prep" table) manages conditions unique to the font. For each instance that a glyph of the font is resized, the display resolution changes, etc., the instructions unique to the font included in the program table 304 may be executed before the instructions associated with presenting in the glyph are executed.

In one arrangement, to increase hinting efficiency, font compactness, etc., each character, glyph shape, etc., of a font (e.g., outline font) may be analyzed and auto-hinting instructions produced for being embedded in the font (e.g., included in the font information file 210). When the characters are being presented (e.g., at run time), the embedded instructions are executed to adjust the associated font character to improve presentation (e.g., rasterized bitmaps of the character shapes).

By embedding the auto-hinting functionality with the font, conventional instructions (e.g., byte codes) for hinting do not need to be stored with each font character. Rather, when being presented (e.g., at run time), an instruction (e.g., a function call) is executed to hint the character. In one instance, a function embedded in the font (e.g., the font information file 210) determines the appropriate CVT entry (stored in the CVT 302) at run time based upon data provided with the function (e.g., a function identifier, character outline data points, etc.). By determining the CVT entry during execution of the function (e.g., at run time), an index for this CVT entry does not need to be stored. In some arrangements, along with determining the CVT index at run time by executing a function, other quantities may be determined (e.g., the points to be adjusted, height location changed, to hint the character font).

In one arrangement, the executed instruction may also determine other quantities. For example, points on the character outline may be determined whose location may be adjusted (e.g., along the y-direction) as well as associated points that need to track the movement of the initial points. For instance, the point located at maximum height of an upper case character "O" (located on an outer circle that defines the character) may need to be adjusted in the y-direction for hinting. The point at the maximum height of an inner circle (that also defines the outline of the character) may correspondingly have its height adjusted by a similar amount to appropriately hint the character. One or more types of auto-hinting functionality may be utilized; for example, one of the three techniques mentioned above may be employed to reduce memory needs, data transfer times (for font delivery), etc.

For using a single instruction (with identifying information), a single function call that includes a function identifier (e.g., a number) may be embedded with a character to provide hinting functionality. Similar to a single function call, other types of individual instructions may be employed; for example, a definition instruction (e.g., Instruction DEFinition (IDEF[ ])) may be employed to providing hinting operations. By meeting one or more conditions (such as substantially determining the same outline points identified as desired points for hinting the character), the single function call with an identifier can be considered optimum. Various operations may be initiated from this function call to hint the associated character. For example, upon identifying the character outline points, operations may be executed to determine CVT values for the identified points along with any associated points whose position needs to be similarly adjusted (e.g., in the y-direction to adjust character height). Upon determining the points, CVT values, etc., operations may be executed to move the identified points and any associated points by appropriate amounts (e.g., adjust the height of the points based upon the CVT values of corresponding points). Once the point positions are adjusted, other operations may be executed; for example, portions (e.g., curves) or the overall outline of the character may be smoothed. For example, an Interpolate Untouched Points (IUP) instruction may be executed for smoothing portions of the character in one direction (e.g., in the y-direction (IUP [Y]), in the x-direction (IUP[X]), etc.).

For situations in which the one or more conditions are not satisfied by the single instruction (e.g., a function call does not identify appropriate outline points for adjustments), a second technique may be employed. For example, a single instruction (e.g., a function call) that includes additional data (e.g., arguments that identify points to be adjusted) may be executed. While additional data is provided (e.g., identified character outline points), the executed instruction (e.g., the function call) determines information (e.g., CVT values) and thereby conserves memory by not storing the information (e.g., indexes to the CVT values) with each font character included in the font information file 210. The additional data provided with the instruction may take a variety of forms, represent different information, etc. For example, the data may be grouped for assisting with operation execution. For example, a group may be formed of points to be similarly moved (e.g., two points to be moved to a global height value or values, identified points and associated points to be moved in a similar manner, etc.). These individual instructions (e.g., a function call, a function call with arguments, etc.) and correspondingly used instructions, subroutines, processes, etc. may be stored with the respective font character by using one or more techniques. For example, the instructions, data (e.g., points), etc. may reside in the font program table 304. Stored in such a manner, an identifier included with the instruction (e.g., a number that identifies a function call) can be used to retrieve information, such as data, other instructions for execution, etc. Similar to using a single instruction with just an identifier (e.g., a function call with function identifier), a single instruction with additional data (e.g., a function call with arguments) may execute operations to appropriately move points (e.g., using the points provided by the arguments) and operations to smooth curves of the character (e.g., execute an Interpolate Untouched Points in Y (IUP[Y])). Also similarly, different types of instructions may be employed; for example IDEFs instructions may be used rather than function calls.

For the situations in which a single instruction (e.g., a function call, a function call with arguments identifying character outline points, etc.) is unable to satisfy the one or more predefined conditions (e.g., identify desired outline points to hint the character), a third technique may be employed. For example, multiple instructions may be used to provide operations for hinting the associated font character. In one arrangement, multiple function calls may be employed to appropriately identify and move points on the outline of a font character. Other programming techniques are also employable; for example, one or more looping techniques may be used to repeatedly execute instructions (e.g., calling a function) for a number of iterations until one or more conditions are met, etc. For example, a LOOPCALL instruction may be used for identifying points, pairs of points (e.g., a point and an associated point, etc.), etc. for performing operations (e.g., moving the points based on a CVT value). Multiple function calls that, for example, respectively include arguments (e.g., different character outline points) may be executed (e.g., to move the points). Similar to the other techniques, instructions such as IDEFs could be employed.

Figure 4:
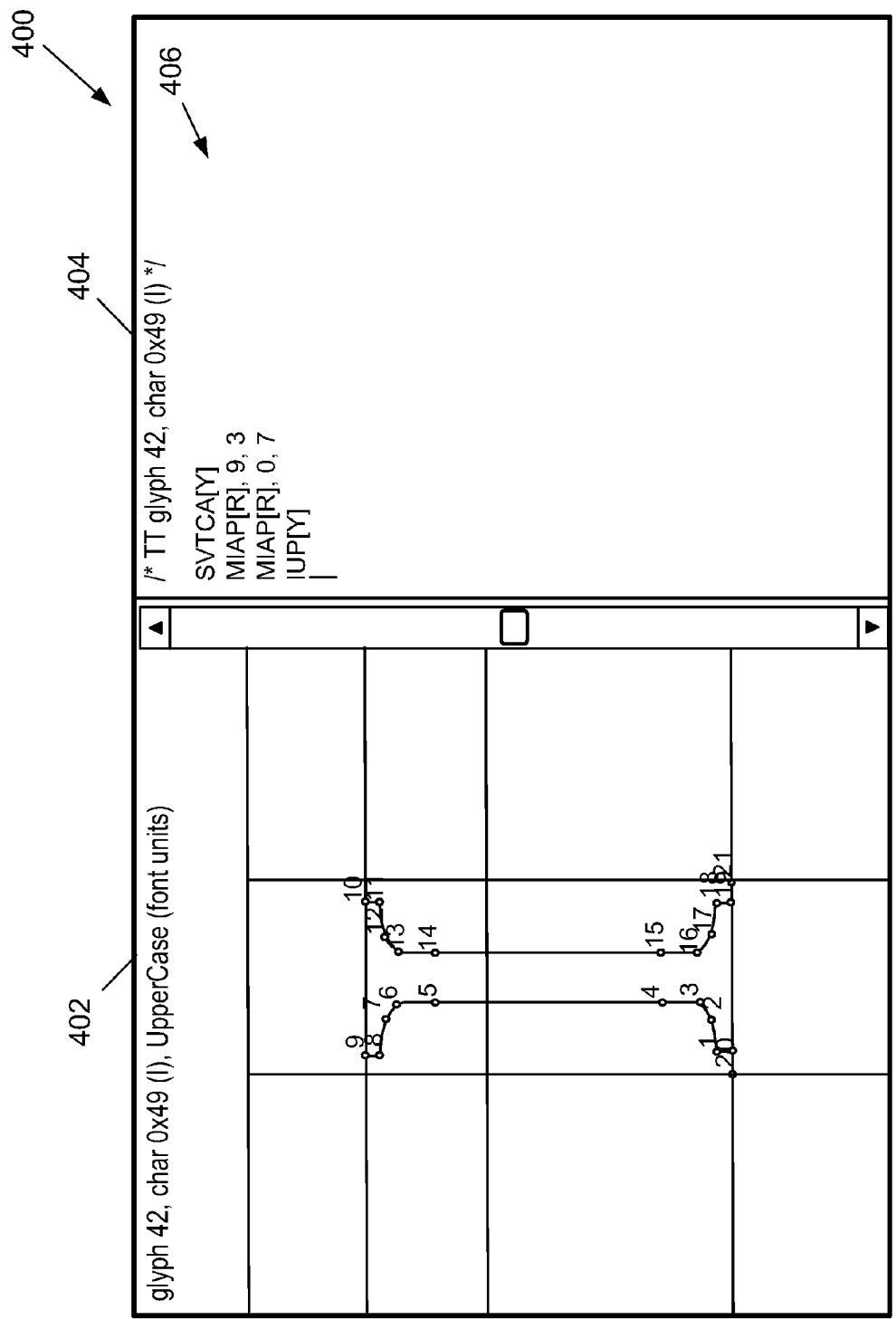
FIGS. 4-11 illustrate interfaces presenting font character outlines and hinting instructions.
Figure 5:
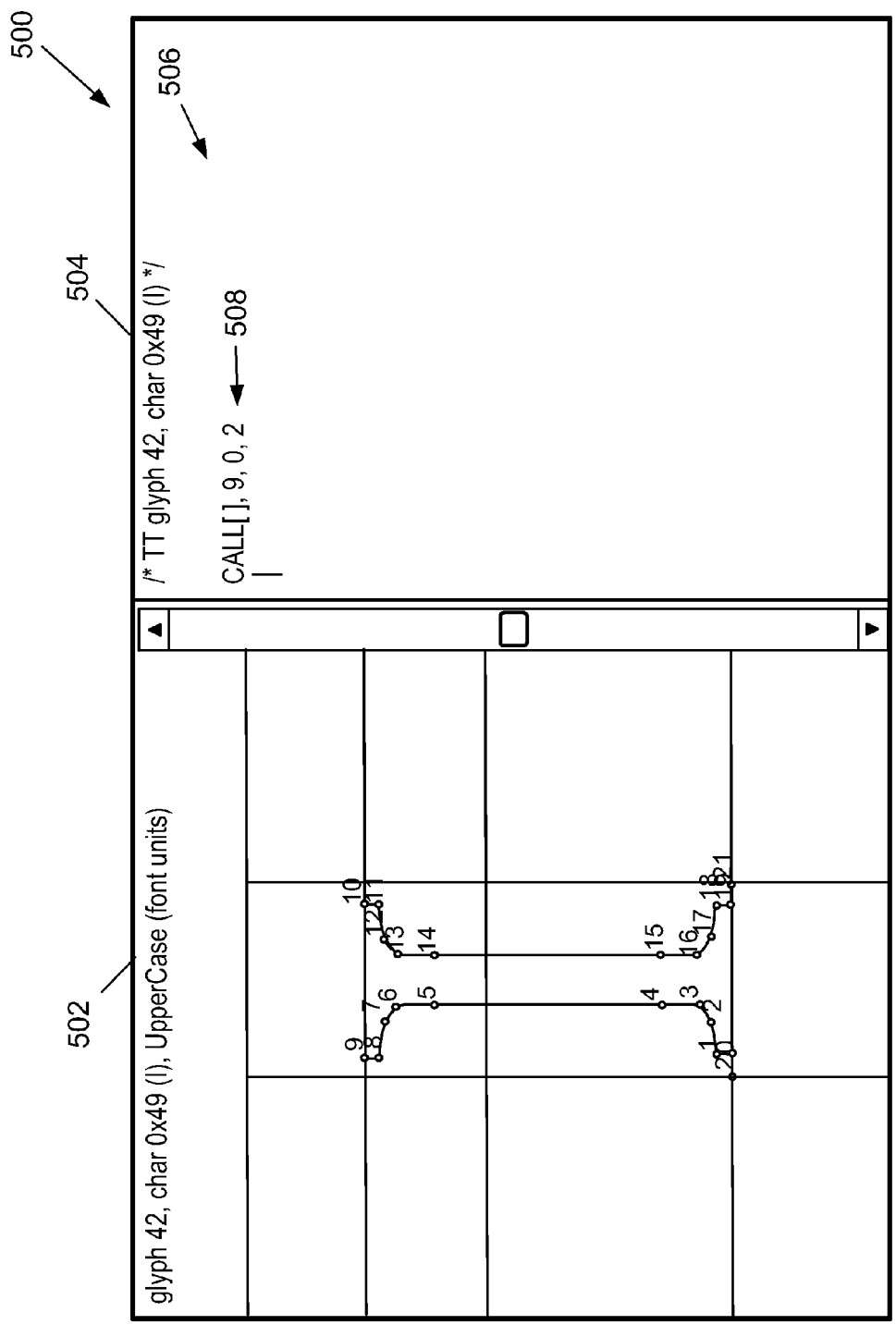

Referring to FIGS. 4 and 5, a graphical illustration demonstrates the use of a single instruction for hinting a character of a font. Shown in FIG. 4, a display 400 is presented in which a left portion 402 of the display presents a graphical representation of the character along with associated information (e.g., numbers assigned to particular points on the outline of the character). In particular, the outline of an upper case character "I" in TrueType format is presented as being defined by nineteen points. The display 400 also includes a right portion 404 that presents a listing 406 of the instructions (e.g., TrueType instructions) for hinting the character. As provided by the listing 406, four instructions are employed to hint the character. The instructions can be represented in various forms; for example, the instructions can be stored as a series of bytecode and used by the font hinter 218 (shown in FIG. 2) for presenting the font character.

As presented, the listing 406 include four individual instructions, which, in total, amount to a size of 9 bytes. To aid the description, each are which are each provided with a line number:

0: SVTCA[Y]
1: MIAP[R], 9, 3
2: MIAP[R], 0, 7
3: IUP[Y]

Line 0 includes a Set Vectors To Coordinate Axis [Y] instruction (SVTCA[Y]) that informs the font hinter 218 (or other type of interpreter of the command) that the following instructions (e.g., for measuring, moving, etc.) are executed with reference to the Y-axis, rather than the X-axis (which may be the default axis). Hinting instructions are generally provided in one direction (e.g., with respect to the Y-axis) prior to switching to another direction (e.g., with respect to the X-axis). The next instruction, presented on line 1, represents Move Indirect Absolute Point instruction that moves an identified point on the character outline by a value (e.g., provided by the CVT 302). In this example, the instruction uses the control value 3 (from the CVT 302) to specify height for the point identified by the point (9). Additionally the instruction rounds the point to the grid. In effect, the instruction moves identified point (9) and rounds to properly hint the point to the cap height of the character.

The next instruction, presented on line 2, includes a Move Indirect Absolute Point (MIAP) and rounding [R] the point to the grid. Similarly to the previous use of the instruction, the MIAP[R] instruction uses a control value 7 (from the CVT 302) to specify a height for the point and performs rounding at this point's location on the character outline (near the baseline). Presented in line 3, the next instruction is Interpolate Untouched Points (IUP) in the [Y] direction. Executing this instruction effectively smooth the character outline in the y-direction in relation to the points that have been hinted in the y-direction. In this example, these hinted points are points 9 and 0 as identified in line 1 and 2.

Due to the relatively simplistic shape of this character, a small number of four instructions (e.g., TrueType instructions) provide hinting along the y-direction. Furthermore, this same listing of instructions, identified points and height control values need 9 bytes of memory. While such an amount of memory can be considered relatively small, the memory needs can be reduced by using less instructions. For example, a single instruction (e.g., function call) may be used to execute one or more operations associated with hinting a character. By reducing the amount of instructions attached to the characters, memory needs may be reduced along with data transfer time, for example, for providing font information from the font service provider 208 to a user device (e.g., the smartphone 100). Since less data (e.g., TrueType hint byte codes) is attached to font character data (e.g., web fonts), less time may be needed for loading and presenting web assets (e.g., web pages, websites, etc.).

Referring to FIG. 5, another display 500 (similar to the display in FIG. 4) is illustrated that includes a left portion 502, which presents the character outline, and a right portion 504 that presents an instruction listing 506 (e.g., TrueType instructions) for hinting the character (e.g., capital "I"). Similar to the outline presented in FIG. 4, nineteen points are identified on the character outline and assigned numbers. However, rather than using multiple instructions, a single instruction 508 is included in the listing 506 and used for hinting the character. This instruction is provided below with the line number "0":

0: CALL[ ], 9, 0, 2

In this example, the single instruction 508 is a function call that includes data to identify the particular function for execution. In this particular example, the number "2" in the function call represents an index to the function call, which identifies hinting instructions (e.g., TrueType instructions). Additionally, the function call 508 also includes the points that need to be hinted (in the y-direction, for this example). In particular, the function call 508 includes the two points on the character outline (e.g., point 9 and point 0) to be hinted to a height control value. While these three numbers are provided with the function call 508, height related values, such as CVT values, indexes, etc., are absent from the call. Along with providing direction to appropriate hinting instructions, the function call 508 also provides direction to instructions for determining height related values, such as CVT values. The instructions provided by the function call may start with instructions such as SVTCA[Y] and end with the instruction IUP[Y]. However, by eliminating explicit calls to these instructions (along with other hinting instructions) and the related height values (e.g., CVT values), the instruction listing 506 uses 5 bytes of memory compared to the 9 bytes used by the listing 406 (shown in FIG. 4). As such, while the upper case "I" is relatively simplistic, a considerable memory saving may be achieved through the use of a single instruction, such as a function call. Savings may also be achieved with more complex font characters.

Figure 6:
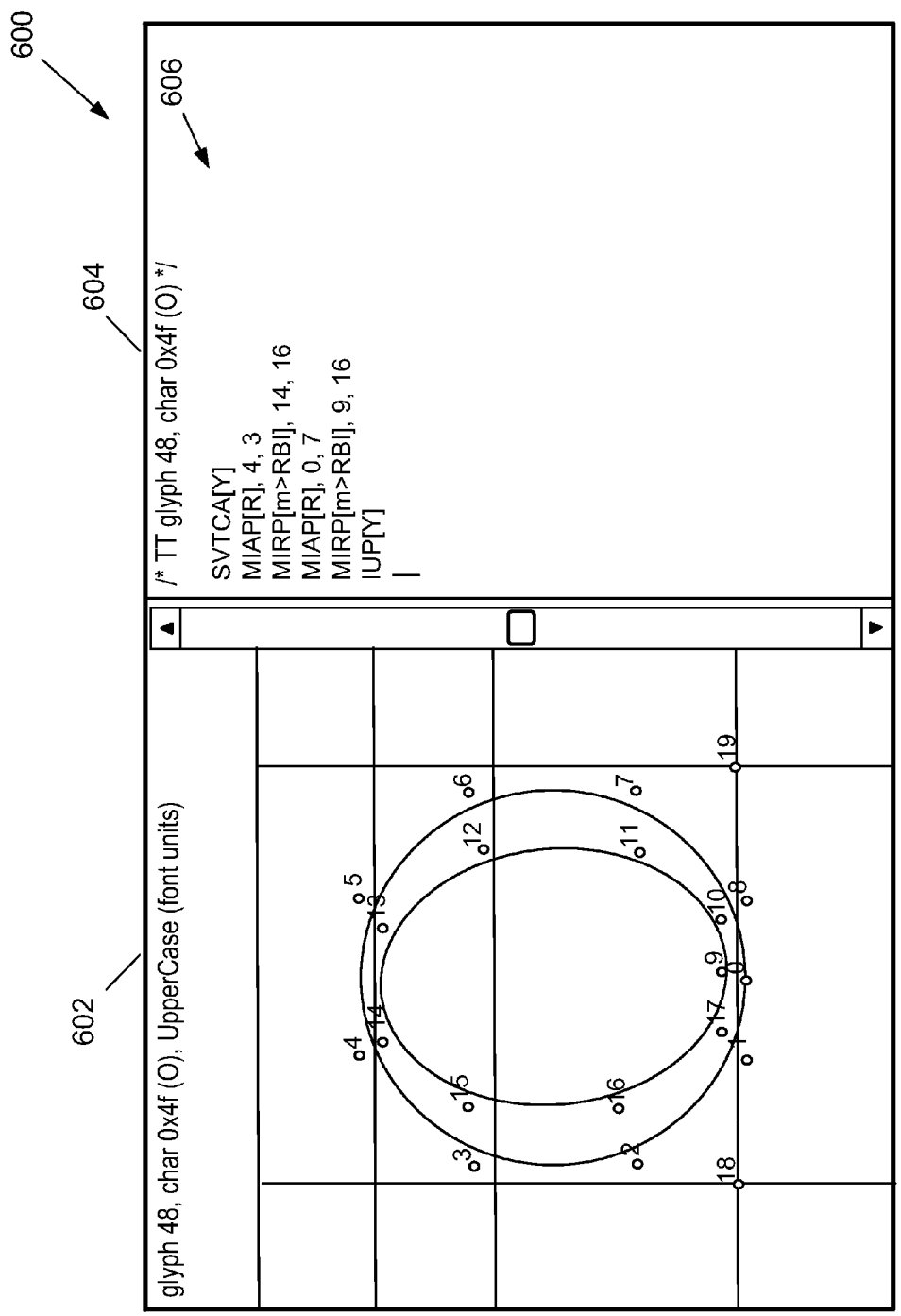

Referring to FIG. 6, another display 600 is illustrated with a left portion 602 that presents another font character (e.g., upper case "O") and a right portion 604 that presents a listing 606 of hinting instructions for the character. Similarly to the previous character, nineteen points are identified on the outline of the character for directing hinting operations. The hinting instructions amount to 15 bytes of memory space, and are presented with line number to assist their description:

0: SVTCA[Y]
1: MIAP[R], 4, 3
2: MIRP[m>RB1], 14, 16
3: MIAP[R], 0, 7
4: MIRP[m>RB1], 9, 16
5: IUP[Y]

The instructions included in lines 0 and 1 (e.g., SVTCA and MIAP) provide the functionality as described with respect to the listing 506 (shown in FIG. 5). As presented in line 2, a Move Indirect Relative Point (MIRP) instruction is provided and generally moves a point relative to a previously defined reference point. In this example, point 4 is the reference point as provide by the MIAP instruction of line 1. The MIRP instruction of line 2 can be considered as hinting across a black stroke. In the MIRP instruction of line 2, point 14 is being hinted based upon point 4 (as specified in line 1) and using the control value 16 for the stroke. As illustrated in the left portion 602 of the display 600, points 4 and 14 are in relatively close proximity. Referring to line 4, an MIRP instruction similarly hints the point 9 on the character outline with respect to point 0 (as specified by the MIAP instruction in line 3) and uses the control value 16 for the stroke. Once these instructions are executed, an IUP instruction is executed for interpolating untouched points in the y-direction as presented in line 3. In this example, the instructions in the listing 606 need 15 bytes of memory for storage. However, as seen in regard to FIG. 5, by utilizing a single instruction, the memory needed for storing, transmitting, etc. may be reduced.

Figure 7:
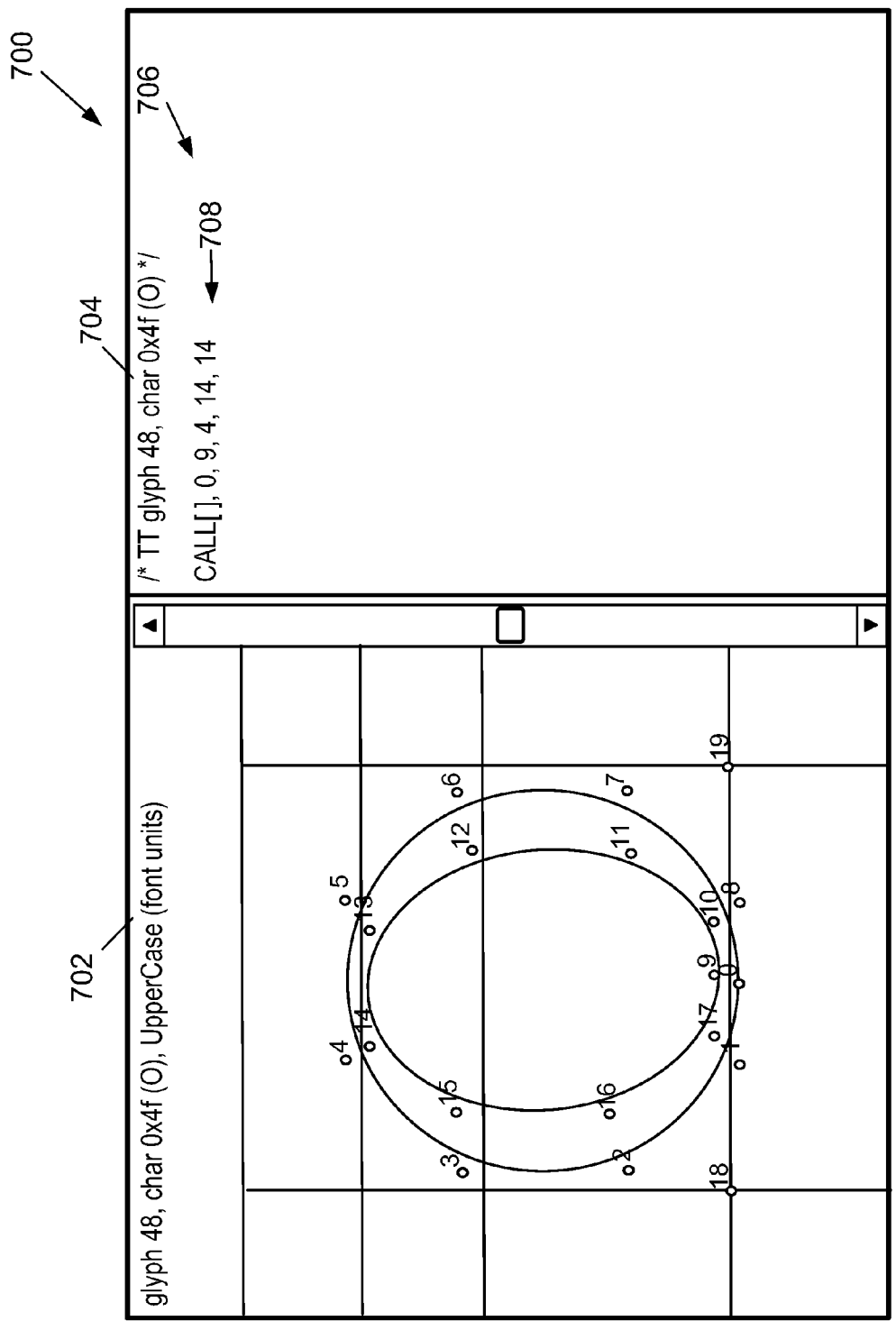

Referring to FIG. 7, the character outline of the capital letter "O" may also be hinted by using a single instruction, such as a function call. As illustrated in a display 700, the graphical representation of the character (in left portion 702) can be hinted using a single function call 708 that is included in an instruction listing 706 (presented in the right portion 704 of the display). By using the single instruction, the memory needs for storage, transfer, etc. may be significantly reduced. In this example, the listing 706 including the single instruction, may need 7 bytes of memory, which amounts to less than half the memory needed by the multi-instruction listing 606 (shown in FIG. 6) for this same character.

In this particular example, the single function call is identified with the number 14, which is included in a series of number for use in calling the function (or routine, process, etc.). As illustrated in the listing 706, the instruction 708 reads:

CALL[ ], 0, 9, 4, 14, 14

Along with identifying the function call with the number 14 in the right most position of the series of numbers, the series includes four other arguments for use in calling the identified function. In this example, each of these other integer arguments (e.g., 0, 9, 4 and 14) represents a point of the character outline that should be hinted. Furthermore, these four points may be presented in ordered pairs. For example, the points represented by the first and third arguments (e.g., 0 and 4) are each related to a height control value. Paired with the point in the first argument (e.g., 0), the second argument (e.g., 9) represents a point that should be hinted relative to the first point of the pair. As such, function call 14 hints point 0 to a height control value and then hints point 9 relative to point 0. Similarly, the point provided by the fourth argument (e.g., 14) is hinted relative to the third argument (e.g., 4) from which a pair is formed. As such, function call 14 hints point 4 to a height control value and then hints point 14 relative to point 4. Other orderings, pairings, etc., may be employed along with other types of formats for representing the single instruction to execute hinting operations.

Figure 8:
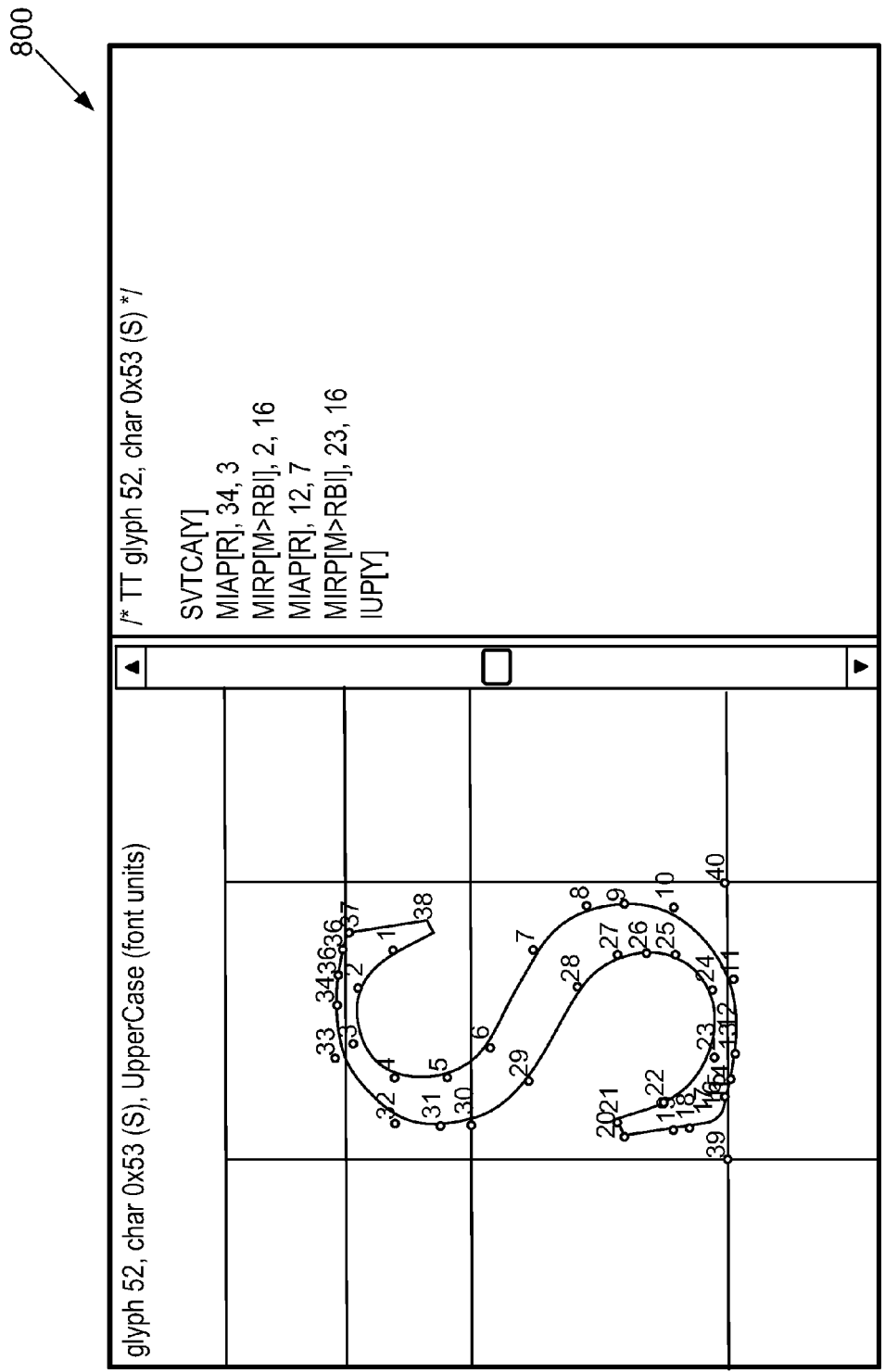
Figure 9:
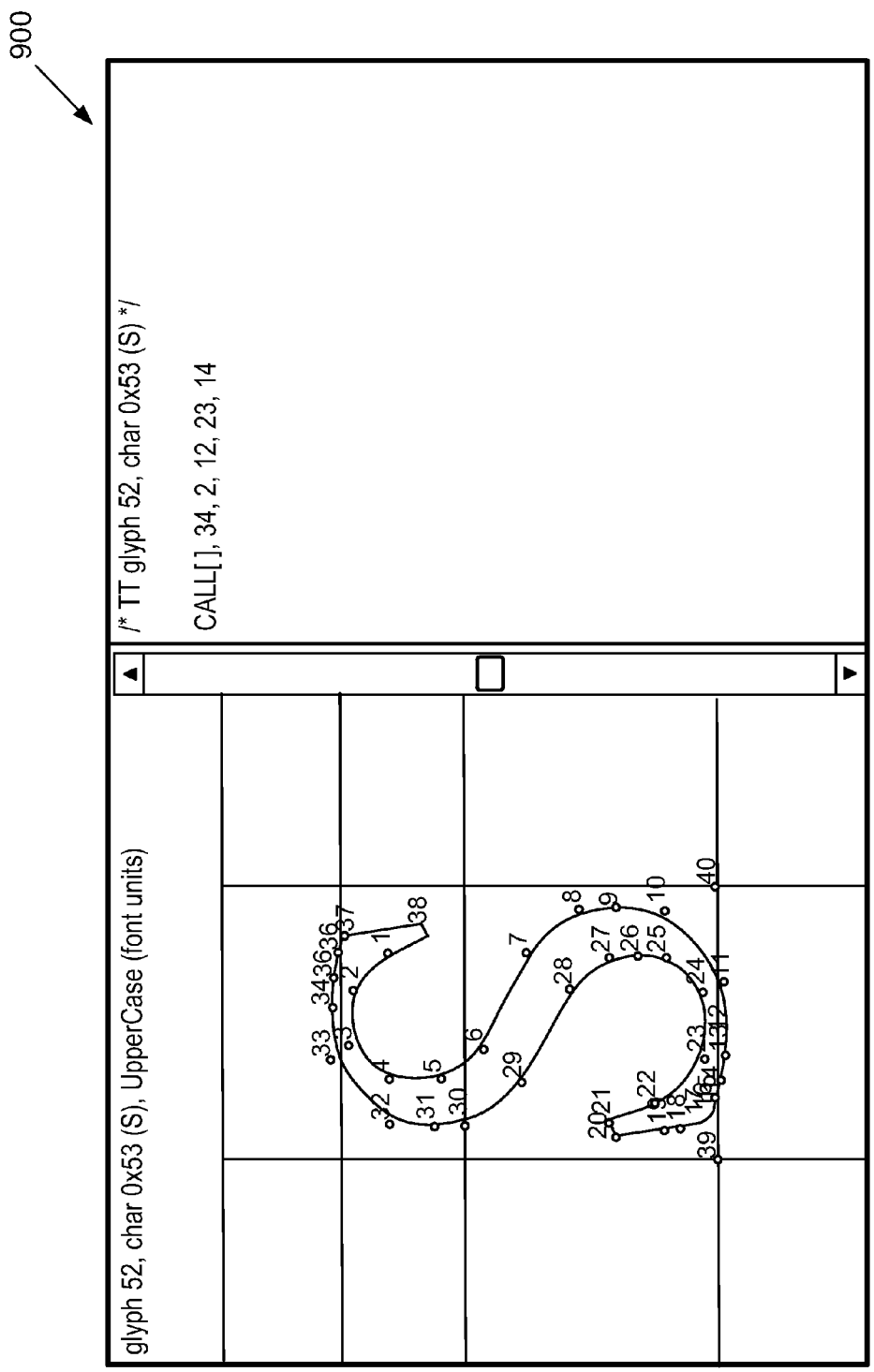

Referring to FIG. 8 a character outline (of the upper case letter "S") is presented (in one portion of a display 800) along with a listing of multiple instructions (presented in another portion of the display). Similar to the character outline presented in earlier figures, the amount of instructions and corresponding memory space may be reduced. For example, a display 900 shown in FIG. 9 includes a portion that presents the single function call for hinting the character outline. Similar to the single function call presented in FIG. 7, the function call presented in the display 900 is identified by 14 and hints point 34 to a height control value, and then hints point 2 relative to point 34. Turning to the next point pair included in the function, function call 14 hints point 12 to a height control value and then hints point 23 relative to point 12.

Figure 10:
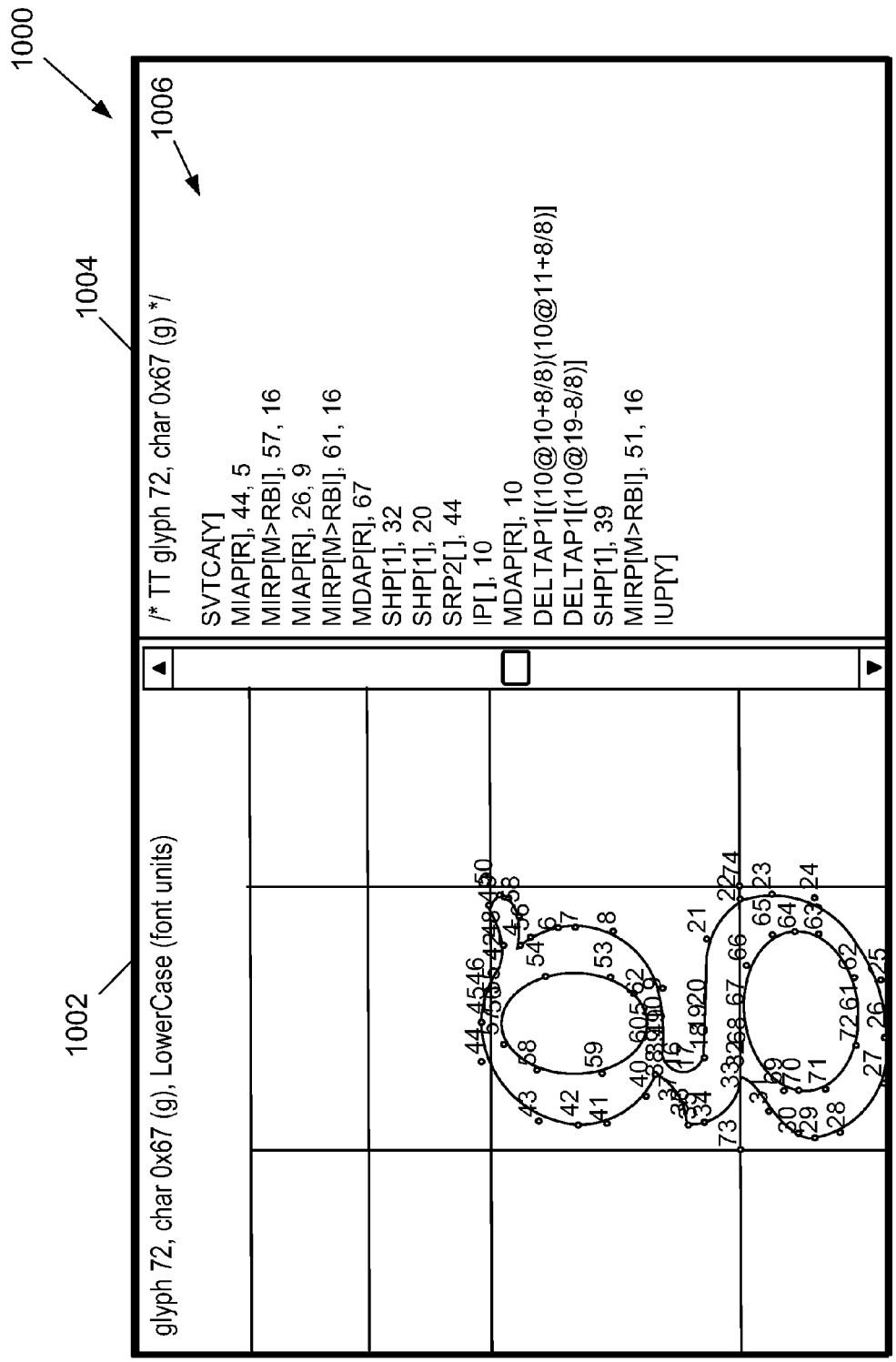
Figure 11:
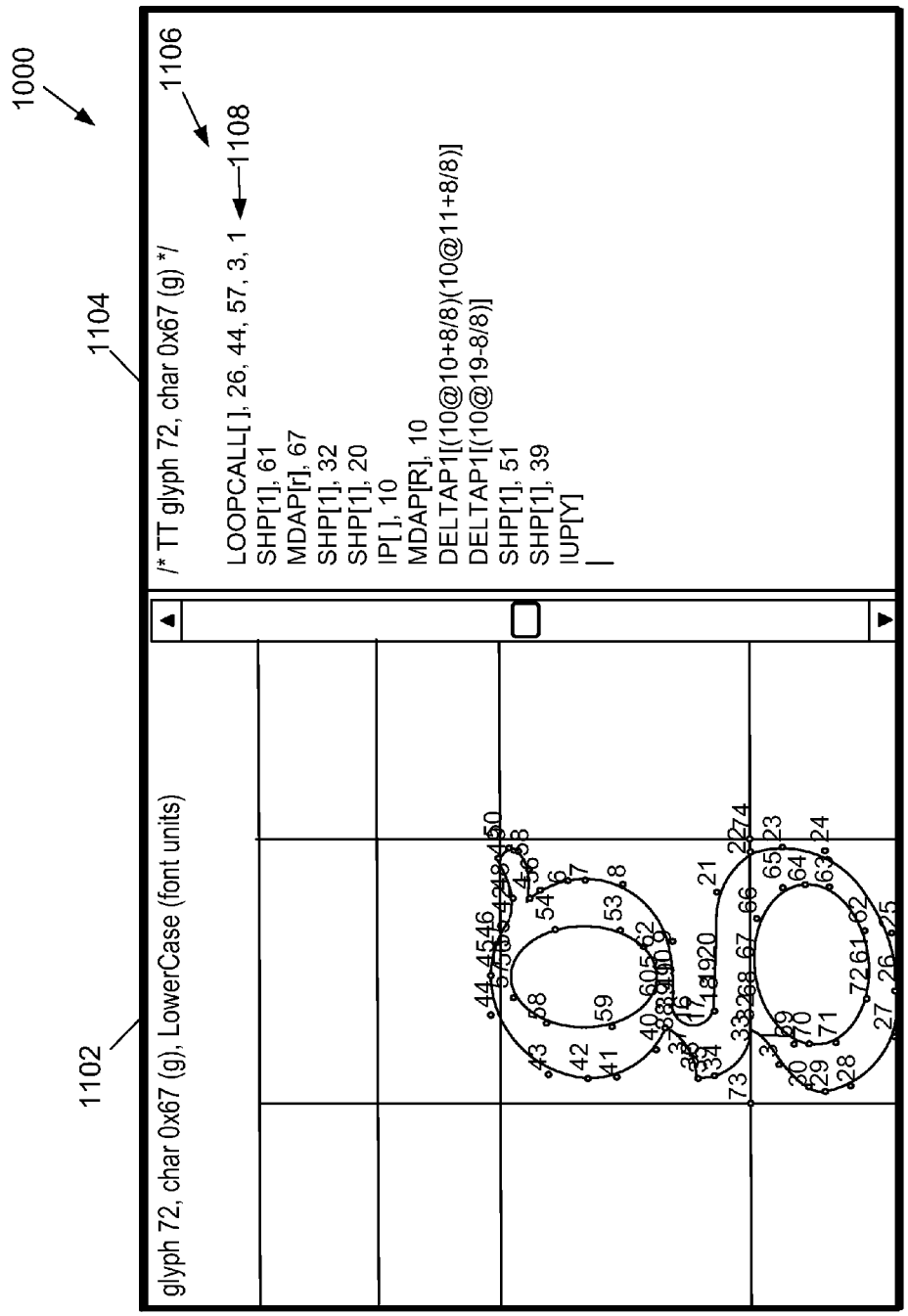

As demonstrated in FIGS. 4 and 5, FIGS. 6 and 7, and FIGS. 8 and 9, character outlines of relatively simple shapes may be hinted by employing a single instruction, such as a single function call. For more complex shaped character outlines, performing such hinting operations with a single instruction may not be as advantageous compared to less complex shaped character outlines. For example, using a single instruction may be less computationally efficient. As such, using one or more other techniques may be employed to provide hinting operations. For example, multiple instructions may be employed that include one or more function calls and/or potentially other types of instructions. For example, in FIG. 10, a character outline (for the lower case letter "g") is presented in a left portion 1002 of a display 1000 and a listing of instructions 1006 is presented in a right portion 1004 of the display. A comparatively more complex shape, the listing 1006 includes instructions that need 63 bytes of memory to hint the character outline. By reducing the number of instructions, memory needed may correspondingly be reduced along with data transfer needs. For example, referring to FIG. 11, another display 1100 includes a portion 1102 that presents the same character outline and a portion 1104 that presents an instruction listing 1106 that includes a reduced amount of instructions. In this particular example, a looping instruction 1108 (e.g., LOOPCALL[ ]) is used to repeatedly call a function rather that include multiple instances of the instruction to perform hinting operations. For example, rather than including the multiple point moving instructions (e.g., Move Indirect Relative Point (MIRP) and Move Indirect Absolute Point (MIAP) instructions), a single looping instruction is provided in the instruction listing 1006:

LOOPCALL[ ] 26, 44, 57, 3, 1

This instruction calls a function, identified by the number 1, which is called for three iterations for respectively moving the points 26, 44 and 57, to hint the character outline. By reducing the amount of instructions, less memory is needed for storing, transferring, etc. the instructions. In this particular example, the memory needs can be reduced from 63 bytes to 35 bytes. Some instructions that appear in the listing 1106 are also present in the listing 1006. While the instruction listing 1006 reduces memory needs, multiple instructions are used rather than a single instruction as included in instruction listings 506, 706 and 906 (as respectively shown in FIG. 5, FIG. 7 and FIG. 9). While a listing may be developed that includes a single instruction, such listings may not be computationally efficient compared to using a reduced instruction listing that contains multiple instructions. Further, instructions may not be removed from a listing in order to appropriately hint a font character in some arrangements.

As mentioned, one or more techniques may be implemented for employing such instruction listings, for example, to store, transfer, etc. hinting information with font characters. Implementations may utilize a single instruction (e.g., a function call that only includes information to identify the function), a single instruction with additional information (e.g., a function call along with arguments that represent points of a character outline), multiple instructions (e.g., multiple function calls with data points, a loop instruction), etc. for hinting characters. To determine the appropriate technique for a particular character, each may be applied and respectfully compared to data that represents the hinted character as desired. For example, if a single instruction (e.g., a function call with only identifying information) produces the hinted character within an acceptable level of deviation (e.g., a predetermined threshold), the single instruction may be employed for this character. In one arrangement, an acceptable level may be based upon the points determined to hint the character. For example, if the points determined by the single instruction substantially match the points determined for the desired hinting, the threshold may be considered satisfied and the single instruction is used for hinting the character.

If the level of deviation is not acceptable, the character may be hinted by employing another technique, such as using a single instruction along with additional data (e.g., a function call along with data that represents one or more character outline points). If this second technique produces hinting within an acceptable level (e.g., an appropriate number of character outline points were identified), the single instruction with the additional information can be used for hinting the character. If the level of deviation is not acceptable, multiple instructions can be used for hinting the character. Various comparison techniques may be used to determine which technique or techniques to utilize; as mentioned, the number of points identified by the technique may provide a merit. Hinting provided by the techniques may also be employed. For example, outline point locations may be compared between the hinted character and the desired hinted character. As mentioned, a sequence of employing these techniques may be used to assist with appropriate selection. For example, deviations of the desired hinted character may be first compared to the hinted character produced from the single instruction (e.g., outline points determined from a single function call). If the comparison reports this technique less than acceptable, the second technique that uses a single instruction (e.g., function call) with additional information (e.g., arguments representing character outline points) may next be compared to the character hinted as desired. If that comparison reports the second technique as being less than acceptable, the third technique of using multiple instructions can be employed.

Other types of sequences, conditions, etc. may similarly be employed for identifying the technique to hint a particular character (e.g., use a single function call with arguments for hinting lower case "s" and multiple instructions for hinting lower case "g").

Figure 12:
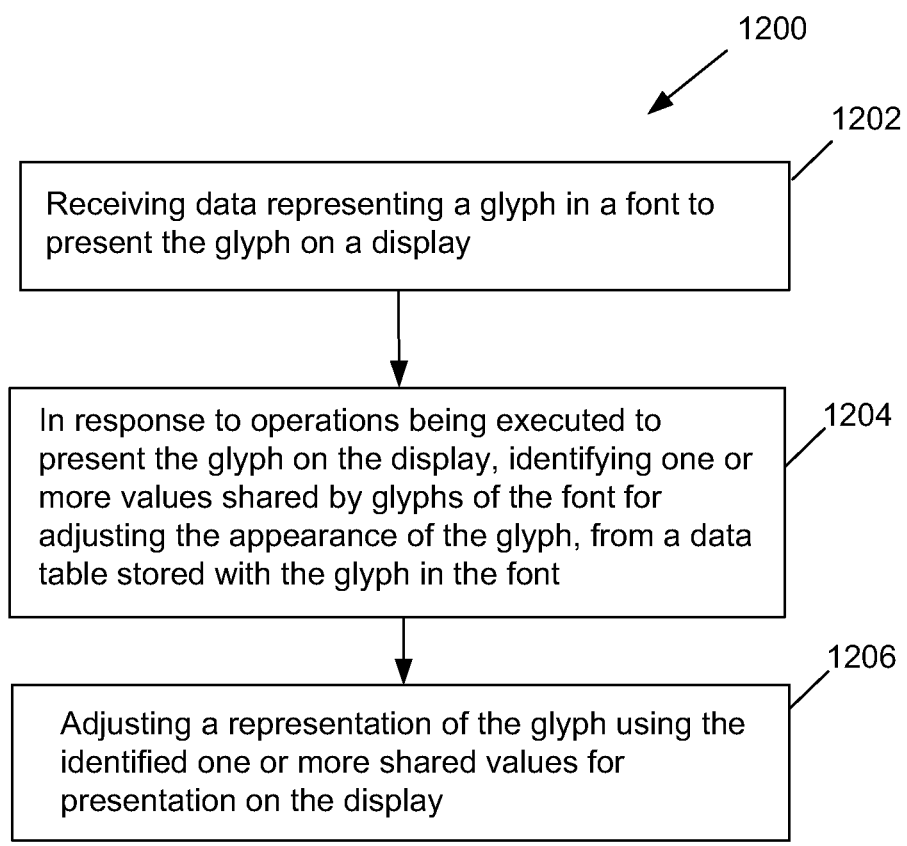
FIG. 12 is an example flow chart of font hinting operations.

Referring to FIG. 12, a flowchart 1200 represents operations of a font render (e.g., the font renderer 218 shown in FIG. 2). Operations of the font renderer are typically executed by a single computing device (e.g., the smartphone 100); however, operations of the font renderer may be executed by multiple computing devices. Along with being executed at a single site (e.g., the location of an end user), the execution of operations may be distributed among two or more locations. In some arrangements, a portion of the operations may be executed at the font service provider 208 (e.g., by the font service manager 216).

Operations of the font renderer may include receiving 1202 data representing a glyph in a font to present the glyph on a display. For example, a font file (e.g., the font information file 210 shown in FIG. 2) may be received by a user device (e.g., the smartphone 100 also shown in FIG. 2) from a font service provider. The font file can include data (e.g., font character outlines, etc.) for presenting the characters (e.g., letter, numbers, etc.) in the font on the display of the smartphone. Various fonts, font types, etc. may be employed, for example, a scalable font format (e.g., an OpenType font, TrueType font, etc) may be represented in the font file. In response to operations being executed to present the glyph on the display, operations may include identifying 1204, one or more values shared by glyphs of the font for adjusting the appearance of the glyph, from a data table stored with the glyph in the font. For example, character auto-hinting functionality is embedded within the font character such that hinting of the character occurs at run time. When operations to present a font character are being executed, shared values (e.g., control values) are identified that can be used to adjust the location of points that represent the outline of the font character. For example, an entry in a control value table can be identified from an executed instruction and the corresponding control value attained from the identified entry. As such, data representing the CVT entry (e.g., an index) does not need to be stored with the font as it is determined at runtime. Operations also include adjusting 1206 a representation of the glyph, using the identified one or more shared values for presentation on the display. For example, once a shared value such as a control value is identified from the CVT, the value is used to adjust one or more font character outline points (e.g., move the location of a point, move the location of a point and one or more associated points). By adjusting the presentation of the outline points, the aesthetic appearance of the font character can be generally improved for the display (e.g., a lower resolution display), as can the legibility of the character.

Figure 13:
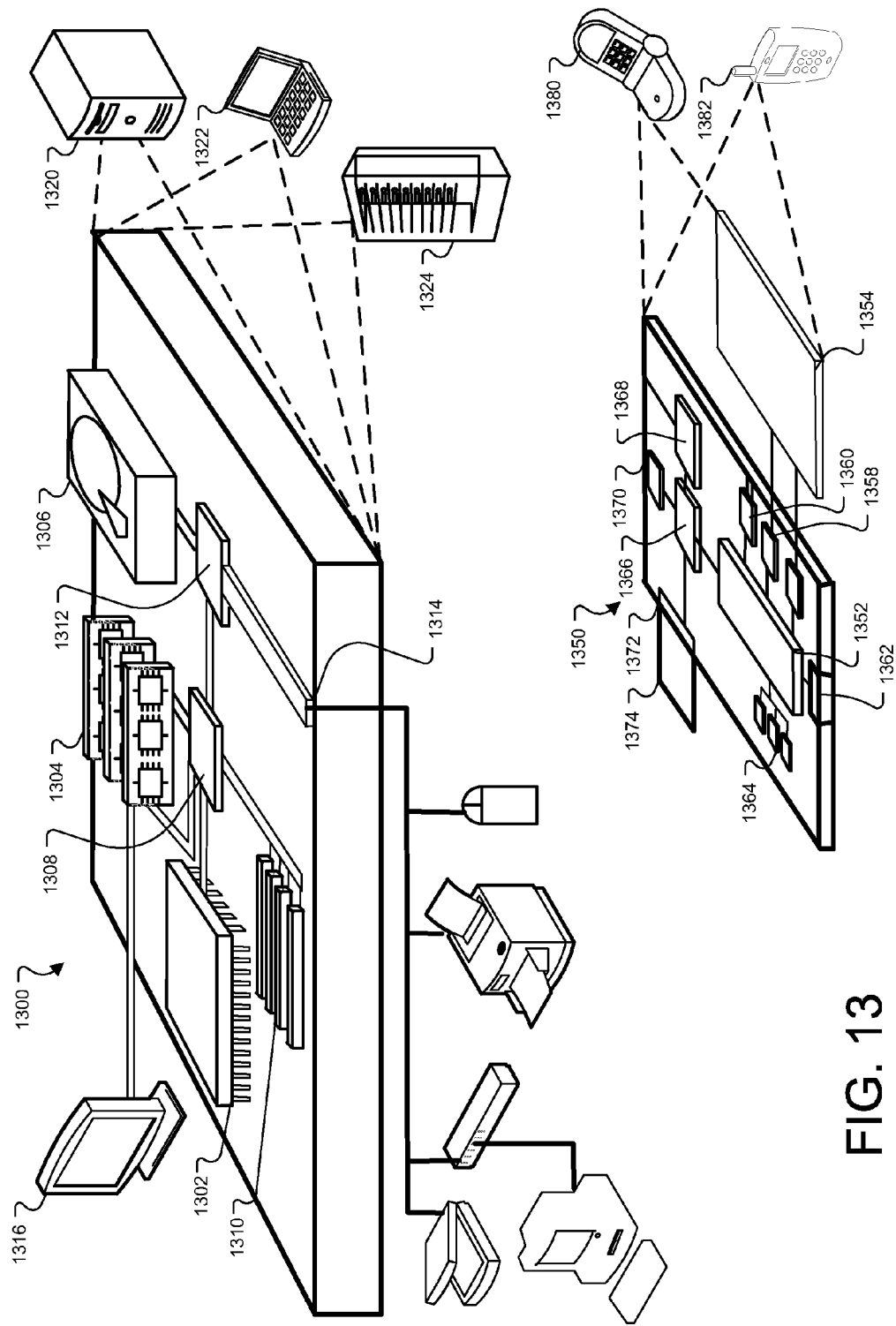
FIG. 13 illustrates an example of a computing device and a mobile computing device that can be used to implement the techniques described here.

FIG. 13 shows an example of example computer device 1300 and example mobile computer device 1350, which can be used to implement the techniques described herein. For example, a portion or all of the operations of the font hinter 220 (shown in FIG. 2) may be executed by the computer device 1300 and/or the mobile computer device 1350. Computing device 1300 is intended to represent various forms of digital computers, including, e.g., laptops, desktops, workstations, personal digital assistants, servers, blade servers, mainframes, and other appropriate computers. Computing device 1350 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1300 includes processor 1302, memory 1304, storage device 1306, high-speed interface 1308 connecting to memory 1304 and high-speed expansion ports 1310, and low speed interface 1312 connecting to low speed bus 1314 and storage device 1306. Each of components 1302, 1304, 1306, 1308, 1310, and 1312, are interconnected using various busses, and can be mounted on a common motherboard or in other manners as appropriate. Processor 1302 can process instructions for execution within computing device 1300, including instructions stored in memory 1304 or on storage device 1306 to display graphical data for a GUI on an external input/output device, including, e.g., display 1316 coupled to high speed interface 1308. In other implementations, multiple processors and/or multiple busses can be used, as appropriate, along with multiple memories and types of memory. Also, multiple computing devices 1300 can be connected, with each device providing portions of the necessary operations (e.g., as a server bank, a group of blade servers, or a multi-processor system).

Memory 1304 stores data within computing device 1300. In one implementation, memory 1304 is a volatile memory unit or units. In another implementation, memory 1304 is a non-volatile memory unit or units. Memory 1304 also can be another form of computer-readable medium (e.g., a magnetic or optical disk. Memory 1304 may be non-transitory.)

Storage device 1306 is capable of providing mass storage for computing device 1300. In one implementation, storage device 1306 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1304, storage device 1306, memory on processor 1302, and the like.)

High-speed controller 1308 manages bandwidth-intensive operations for computing device 1300, while low speed controller 1312 manages lower bandwidth-intensive operations. Such allocation of functions is an example only. In one implementation, high-speed controller 1308 is coupled to memory 1304, display 1316 (e.g., through a graphics processor or accelerator), and to high-speed expansion ports 1310, which can accept various expansion cards (not shown). In the implementation, low-speed controller 1312 is coupled to storage device 1306 and low-speed expansion port 1314. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1300 can be implemented in a number of different forms, as shown in the figure. For example, it can be implemented as standard server 1320, or multiple times in a group of such servers. It also can be implemented as part of rack server system 1324. In addition or as an alternative, it can be implemented in a personal computer (e.g., laptop computer 1322.) In some examples, components from computing device 1300 can be combined with other components in a mobile device (not shown), e.g., device 1350. Each of such devices can contain one or more of computing device 1300, 1350, and an entire system can be made up of multiple computing devices 1300, 1350 communicating with each other.

Computing device 1350 includes processor 1352, memory 1364, an input/output device (e.g., display 1354, communication interface 1366, and transceiver 1368) among other components. Device 1350 also can be provided with a storage device, (e.g., a microdrive or other device) to provide additional storage. Each of components 1350, 1352, 1364, 1354, 1366, and 1368, are interconnected using various buses, and several of the components can be mounted on a common motherboard or in other manners as appropriate.

Processor 1352 can execute instructions within computing device 1350, including instructions stored in memory 1364. The processor can be implemented as a chipset of chips that include separate and multiple analog and digital processors. The processor can provide, for example, for coordination of the other components of device 1350, e.g., control of user interfaces, applications run by device 1350, and wireless communication by device 1350.

Processor 1352 can communicate with a user through control interface 1358 and display interface 1356 coupled to display 1354. Display 1354 can be, for example, a TFT LCD (Thin-Film-Transistor Liquid Crystal Display) or an OLED (Organic Light Emitting Diode) display, or other appropriate display technology. Display interface 1356 can comprise appropriate circuitry for driving display 1354 to present graphical and other data to a user. Control interface 1358 can receive commands from a user and convert them for submission to processor 1352. In addition, external interface 1362 can communicate with processor 1342, so as to enable near area communication of device 1350 with other devices. External interface 1362 can provide, for example, for wired communication in some implementations, or for wireless communication in other implementations, and multiple interfaces also can be used.

Memory 1364 stores data within computing device 1350. Memory 1364 can be implemented as one or more of a computer-readable medium or media, a volatile memory unit or units, or a non-volatile memory unit or units. Expansion memory 1374 also can be provided and connected to device 1350 through expansion interface 1372, which can include, for example, a SIMM (Single In Line Memory Module) card interface. Such expansion memory 1374 can provide extra storage space for device 1350, or also can store applications or other data for device 1350. Specifically, expansion memory 1374 can include instructions to carry out or supplement the processes described above, and can include secure data also. Thus, for example, expansion memory 1374 can be provided as a security module for device 1350, and can be programmed with instructions that permit secure use of device 1350. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 1364, expansion memory 1374, and/or memory on processor 1352), which can be received, for example, over transceiver 1368 or external interface 1362.

Device 1350 can communicate wirelessly through communication interface 1366, which can include digital signal processing circuitry where necessary. Communication interface 1366 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1368. In addition, short-range communication can occur, e.g., using a Bluetooth®, WiFi, or other such transceiver (not shown). In addition, GPS (Global Positioning System) receiver module 1370 can provide additional navigation- and location-related wireless data to device 1350, which can be used as appropriate by applications running on device 1350. Sensors and modules such as cameras, microphones, compasses, accelerators (for orientation sensing), etc. may be included in the device.

Device 1350 also can communicate audibly using audio codec 1360, which can receive spoken data from a user and convert it to usable digital data. Audio codec 1360 can likewise generate audible sound for a user, (e.g., through a speaker in a handset of device 1350.) Such sound can include sound from voice telephone calls, can include recorded sound (e.g., voice messages, music files, and the like) and also can include sound generated by applications operating on device 1350.

Computing device 1350 can be implemented in a number of different forms, as shown in the figure. For example, it can be implemented as cellular telephone 1380. It also can be implemented as part of smartphone 1382, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
   receiving data representing a glyph in a font to present the glyph on a display;
   in response to operations being executed to present the glyph on the display, identifying one or more values shared by glyphs of the font for adjusting the appearance of the glyph, from a data table stored with the glyph in the font, either one or multiple instructions being executed based upon a comparison of adjusted versions of the glyph to identify the one or more shared values; and
   adjusting a representation of the glyph using the identified one or more shared values for presentation on the display.

2. The computing device implemented method of claim 1, the font having a scalable font format.

3. The computing device implemented method of claim 1, wherein the shared values associated with the font represent control values.

4. The computing device implemented method of claim 1, wherein in response to the operations being executed to present the glyph on the display, identifying points of an outline of the glyph from data stored with the glyph in the font.

5. The computing device implemented method of claim 4, wherein in response to the operations being executed to present the glyph on the display, identifying one or more adjustments to the identified points of the outline of the glyph.

6. The computing device implemented method of claim 1, wherein identifying the one or more shared values is initiated by executing a single instruction.

7. The computing device implemented method of claim 1, wherein identifying the one or more shared values is initiated by executing a single function call that includes data identifying the single function call.

8. The computing device implemented method of claim 1, wherein identifying the one or more shared values is initiated by executing a single instruction that includes data representing one or more points of the glyph.

9. The computing device implemented method of claim 1, wherein identifying the one or more shared values is initiated by executing a single function call that includes one or more arguments that represent outline points of the glyph.

10. The computing device implemented method of claim 1, wherein identifying the one or more shared values is initiated by executing multiple instructions.

11. The computing device implemented method of claim 1, wherein identifying the one or more shared values is initiated by executing one or more instructions in a repeated manner.

12. The computing device implemented method of claim 1, wherein if the one or more shared values is unattainable from the single function call that includes a function identifier, identifying the one or more shared values is initiated by executing a single function call that includes one or more arguments that represent outline points of the glyph.

13. The computing device implemented method of claim 1, wherein if the one or more shared values is unattainable from the single function call that includes a function identifier and is unattainable from the single function call that includes one or more arguments that represent outline points of the glyph, identifying the one or more shared values is initiated by executing multiple instructions.

14. The computing device implemented method of claim 1, wherein adjusting a representation of the glyph using the identified one or more shared values includes adjusting the position of one or more data points located on an outline of the glyph.

15. A system comprising:
   a computing device comprising:
      a memory configured to store instructions; and
      a processor to execute the instructions to perform operations comprising:
         receiving data representing a glyph in a font to present the glyph on a display;
         in response to operations being executed to present the glyph on the display, identifying one or more values shared by glyphs of the font for adjusting the appearance of the glyph, from a data table stored with the glyph in the font, either one or multiple instructions being executed based upon a comparison of adjusted versions of the glyph to identify the one or more shared values; and
         adjusting a representation of the glyph using the identified one or more shared values for presentation on the display.

16. The system of claim 15, the font having a scalable font format.

17. The system of claim 15, wherein the shared values associated with the font represent control values.

18. The system of claim 15, wherein in response to the operations being executed to present the glyph on the display, identifying points of an outline of the glyph from data stored with the glyph in the font.

19. The system of claim 18, wherein in response to the operations being executed to present the glyph on the display, identifying one or more adjustments to the identified points of the outline of the glyph.

20. The system of claim 15, wherein identifying the one or more shared values is initiated by executing a single instruction.

21. The system of claim 15, wherein identifying the one or more shared values is initiated by executing a single function call that includes data identifying the single function call.

22. The system of claim 15, wherein identifying the one or more shared values is initiated by executing a single instruction that includes data representing one or more points of the glyph.

23. The system of claim 15, wherein identifying the one or more shared values is initiated by executing a single function call that includes one or more arguments that represent outline points of the glyph.

24. The system of claim 15, wherein identifying the one or more control values is initiated by executing multiple instructions.

25. The system of claim 15, wherein identifying the one or more shared values is initiated by executing one or more instructions in a repeated manner.

26. The system of claim 15, wherein if the one or more shared values is unattainable from the single function call that includes a function identifier, identifying the one or more shared values is initiated by executing a single function call that includes one or more arguments that represent outline points of the glyph.

27. The system of claim 15, wherein if the one or more shared values is unattainable from the single function call that includes a function identifier and is unattainable from the single function call that includes one or more arguments that represent outline points of the glyph, identifying the one or more shared values is initiated by executing multiple instructions.

28. The system of claim 15, wherein adjusting a representation of the glyph using the identified one or more shared values includes adjusting the position of one or more data points located on an outline of the glyph.

29. One or more non-transitory computer readable media storing instructions that are executable by a processing device, and upon such execution cause the processing device to perform operations comprising:
receiving data representing a glyph in a font to present the glyph on a display;
in response to operations being executed to present the glyph on the display, identifying one or more values shared by glyphs of the font for adjusting the appearance of the glyph, from a data table stored with the glyph in the font, either one or multiple instructions being executed based upon a comparison of adjusted versions of the glyph to identify the one or more shared values; and
adjusting a representation of the glyph using the identified one or more shared values for presentation on the display.

30. The non-transitory computer readable media of claim 29, the font having a scalable font format.

31. The non-transitory computer readable media of claim 29, wherein the shared values associated with the font represent control values.

32. The non-transitory computer readable media of claim 29, wherein in response to the operations being executed to present the glyph on the display, identifying points of an outline of the glyph from data stored with the glyph in the font.

33. The non-transitory computer readable media of claim 32, wherein in response to the operations being executed to present the glyph on the display, identifying one or more adjustments to the identified points of the outline of the glyph.

34. The non-transitory computer readable media of claim 29, wherein identifying the one or more shared values is initiated by executing a single instruction.

35. The non-transitory computer readable media of claim 29, wherein identifying the one or more shared values is initiated by executing a single function call that includes data identifying the single function call.

36. The non-transitory computer readable media of claim 29, wherein identifying the one or more shared values is initiated by executing a single instruction that includes data representing one or more points of the glyph.

37. The non-transitory computer readable media of claim 29, wherein identifying the one or more shared values is initiated by executing a single function call that includes one or more arguments that represent outline points of the glyph.

38. The non-transitory computer readable media of claim 29, wherein identifying the one or more control values is initiated by executing multiple instructions.

39. The non-transitory computer readable media of claim 29, wherein identifying the one or more shared values is initiated by executing one or more instructions in a repeated manner.

40. The non-transitory computer readable media of claim 29, wherein if the one or more shared values is unattainable from the single function call that includes a function identifier, identifying the one or more shared values is initiated by executing a single function call that includes one or more arguments that represent outline points of the glyph.

41. The non-transitory computer readable media of claim 29, wherein if the one or more shared values is unattainable from the single function call that includes a function identifier and is unattainable from the single function call that includes one or more arguments that represent outline points of the glyph, identifying the one or more shared values is initiated by executing multiple instructions.

42. The non-transitory computer readable media of claim 29, wherein adjusting a representation of the glyph using the identified one or more shared values includes adjusting the position of one or more data points located on an outline of the glyph.

* * * * *